United States Patent
Gimeno-Segovia

(10) Patent No.: US 12,079,688 B2
(45) Date of Patent: Sep. 3, 2024

(54) GENERATION OF ENTANGLED PHOTONIC STATES

(71) Applicant: PSIQUANTUM CORP., Palo Alto, CA (US)

(72) Inventor: Mercedes Gimeno-Segovia, Palo Alto, CA (US)

(73) Assignee: PSIQUANTUM CORP., Palo Alto, CA (US)

( * ) Notice: Subject to any disclaimer, the term of this patent is extended or adjusted under 35 U.S.C. 154(b) by 811 days.

(21) Appl. No.: 17/266,076

(22) PCT Filed: Aug. 7, 2019

(86) PCT No.: PCT/US2019/045563
§ 371 (c)(1),
(2) Date: Feb. 4, 2021

(87) PCT Pub. No.: WO2020/033588
PCT Pub. Date: Feb. 13, 2020

(65) Prior Publication Data
US 2021/0295196 A1    Sep. 23, 2021

Related U.S. Application Data

(60) Provisional application No. 62/715,607, filed on Aug. 7, 2018.

(51) Int. Cl.
*G06N 10/00* (2022.01)
*H04B 10/70* (2013.01)
(52) U.S. Cl.
CPC ............. *G06N 10/00* (2019.01); *H04B 10/70* (2013.01)
(58) Field of Classification Search
None
See application file for complete search history.

(56) References Cited

U.S. PATENT DOCUMENTS

| 6,437,413 B1 | 8/2002 | Yamaguchi et al. |
| 6,472,681 B1 * | 10/2002 | Kane ...................... G06N 10/00 |
| | | 257/14 |

(Continued)

FOREIGN PATENT DOCUMENTS

| JP | 5437634 B2 | 3/2014 |
| WO | WO 2017/189053 A1 | 11/2017 |

OTHER PUBLICATIONS

Kieling, Notice of Allowance, U.S. Appl. No. 16/691,459, filed May 30, 2021, 9 pgs.

(Continued)

*Primary Examiner* — Darren E Wolf
(74) *Attorney, Agent, or Firm* — Morgan, Lewis & Bockius LLP

(57) ABSTRACT

A device includes photon detectors, first photonic modes (coupled with photons sources) for outputting a first set of four photons, second photonic modes to provide a second set of at least four photons to the photon detectors, third photonic modes (coupled with the photon sources) to provide a third set of at least photons to the photon detectors, first couplers coupling modes in the first set of photonic modes to modes in the second set of photonic modes, and second couplers coupling modes of the third set of photonic modes to modes of the second set of photonic modes. The first and second couplers are configured to cause the first photonic modes to output, with a first non-zero probability, a pair of photons in a Bell state when a first number of photons is provided to respective inputs of the first photonic modes and the third photonic modes.

18 Claims, 12 Drawing Sheets

(56) References Cited

U.S. PATENT DOCUMENTS

| | | | |
|---|---|---|---|
| 7,346,246 | B2 | 3/2008 | Munro |
| 7,554,080 | B2 | 6/2009 | Munro et al. |
| 7,667,995 | B1 | 2/2010 | Leuenberger |
| 9,178,154 | B2 | 11/2015 | Bunyk |
| 10,248,491 | B1 | 4/2019 | Zeng et al. |
| 10,352,992 | B1 | 7/2019 | Zeng et al. |
| 10,578,891 | B1 * | 3/2020 | Schmeing ............ G06N 10/00 |
| 11,126,062 | B1 | 9/2021 | Kieling et al. |
| 11,475,347 | B1 | 10/2022 | Rudolph et al. |
| 11,501,198 | B1 | 11/2022 | Birchall et al. |
| 11,543,731 | B1 | 1/2023 | Kieling et al. |
| 2003/0055513 | A1 | 3/2003 | Raussendorf et al. |
| 2005/0133780 | A1 | 6/2005 | Azuma |
| 2007/0252081 | A1 | 11/2007 | Munro et al. |
| 2008/0218519 | A1 | 9/2008 | Coury et al. |
| 2014/0126030 | A1 | 5/2014 | Crespi et al. |
| 2015/0214984 | A1 | 7/2015 | Ahn et al. |
| 2016/0292586 | A1 | 10/2016 | Rigetti et al. |
| 2017/0061317 | A1 | 3/2017 | Chow et al. |
| 2017/0082494 | A1 | 3/2017 | Chow et al. |
| 2018/0114138 | A1 | 4/2018 | Monroe et al. |
| 2019/0244128 | A1 | 8/2019 | Choi |
| 2020/0044749 | A1 | 2/2020 | Rauschenbach et al. |
| 2020/0134502 | A1 | 4/2020 | Anschuetz et al. |
| 2020/0160204 | A1 * | 5/2020 | Johnson ................ G06N 10/00 |
| 2020/0401927 | A1 | 12/2020 | Nickerson et al. |
| 2021/0027188 | A1 | 1/2021 | Nickerson et al. |
| 2021/0105135 | A1 | 4/2021 | Figueroa et al. |

OTHER PUBLICATIONS

Psiquantum Corp., International Preliminary Report on Patentability, PCT/US2019/023756, Sep. 29, 2020, 8 pgs.

Psiquantum Corp., International Preliminary Report on Patentability, PCT/US2019/045563, Feb. 9, 2021, 9 pgs.

Psiquantum Corp., International Search Report and Written Opinion, PCT/US2019/023756, Jul. 29, 2019, 11 pgs.

Ying, "Entangled Many-body States as Resources of Quantum Information Processing." Jul. 23, 2013 (Jul. 23, 2013) Retrieved on Jun. 9, 2019 (Jun. 9, 2019) from http://www.nsx0.quantumlah.org/media/thesis/CQT_130723_LiYing.pdf entire document.

Psiquantum Corp., International Search Report and Written Opinion, PCT/US2019/021241, Jul. 2, 2019, 13 pgs.

Fowler, A.G. and Goyal, "Topological cluster state quantum computing." arXiv:0805.3202v2 (quant-ph), available online: Feb. 25, 2009 (Feb. 25, 2009), Fig 1, 1a, section 1, 11 (online) URL https://pdfs.semanticscholar.org/f1d0/5ccb2ad6d3a61e20c0888c49fca3c8a50a4c.pdf.

Psiquantum Corp., International Search Report and Written Opinion, PCT/US2019/21711, Jul. 22, 2019, 17 pgs.

Browne, Resource-efficient linear optical quantum computation, QOLS, Blackett Laboratory, Imperial College London, Feb. 9, 2005, 5 pgs.

Gimeno-Segovia, Mercedes, From three-photon GHZ states to ballistic universal quantum computation, Phys. Rev. Lett. 115, 020502, Jul. 8, 2015, 6 pgs.

Pant, Percolation Thresholds for Photonic Quantum, Computing, Cornell University, Quantum Physics, Jan. 13, 2017, 14 pgs.

Psiquantum Corp., International Preliminary Report on Patentability, PCT/US2019/021711, Sep. 15, 2020, 14 pgs.

Psiquantum Corp., International Preliminary Report on Patentability, PCT/US2019/021241, Sep. 8, 2020, 10 pgs.

Psiquantum Corp., International Search Report / Written Opinion, PCT/US2019/045563, Oct. 25, 2019, 3 pgs.

Caspani et al. "Integrated Sources of Photon Quantum States Based on Nonlinear Optics." In:Light; Science & Applications 6.11.17 Nov. 2017 (Nov. 17, 2017) Retrieved on Oct. 7, 2019 (Oct. 7, 2019) from <https://www.nature.com/articles/lsa2017100.pdf> entire document.

Dusek. "Discrimination of the Bell States of Qudits by means of linear optics." In: Optics Communications 199. 1-4, Jul. 23, 2001 (Jul. 23, 2001) Retrieved on Oct. 7, 2019 (Oct. 7, 2019) from <https://arxiv.org/pdf/quant-ph/0107119.pdf> entire document.

Cao et al., "Generation of Atomic Entangled States Using Linear Optics." In: arXiv, Preprint quant-ph/0311086, Nov. 13, 2003 (Nov. 13, 2003) Retrieved on Oct. 7, 2019 (Oct. 7, 2019) from <https://arxiv.org/ftp/quant-ph/papers/0311/0311086.pdf> entire document.

Schon et al. "Sequential Generation of Entangled Multiqubit States." In: Physical Review Letter, Jan. 18, 2005, (Jan. 18, 2005) Retrieved on Oct. 7, 2019, (Oct. 7, 2019) from <https://arxiv.org/pdf/quant-ph/0501096.pdf> entire document.

Gimeno-Segovia, Notice of Allowance, U.S. Appl. No. 16/621,994, filed Mar. 30, 2022, 11 pgs.

Rudolph, Notice of Allowance, U.S. Appl. No. 16/689,964, filed May 12, 2022, 10 pgs.

Kieling et al., Notice of Allowance, U.S. Appl. No. 16/691,450, filed Jun. 15, 2022, 12 pgs.

Gimeno-Segovia et al., Notice of Allowance, U.S. Appl. No. 17/849,440, filed Apr. 7, 2023, 11 pgs.

Nickerson et al., Non-Final Office Action, U.S. Appl. No. 16/979,829, filed Aug. 29, 2023, 54 pgs.

Nickerson et al., Non-Final Office Action, U.S. Appl. No. 17/013,192, filed Aug. 31, 2023, 86 pgs.

Paler et al., "Mapping of Topological Quantum Circuits to Physical Hardware", Scientific Reports, University of Passau, Innstr. 43, 94032 Passau, Germany; National Institute of Informatics, 2-1-2 Hitotsubashi, Chiyoda-ku, Tokyo, 101-8430, Japan, Received Sep. 26, 2013, Accepted Mar. 18, 2014, Published Apr. 11, 2014, 10 pgs. https://doi.org/10.1038/srep04657.

Héctor Bombín, "An Introduction to Topological Quantum Codes", Quantum Physics, Perimeter Institute for Theoretical Physics, 31 Caroline St. N., Waterloo, ON, N2L 2Y5, Canada, Nov. 1, 2013, 35 pgs. https://doi.org/10.48550/arXiv.1311.0277.

Stephen S Bullock et al., "Qudit surface codes and gauge theory with finite cyclic groups", Journal of Physics A: Mathematical and Theoretical, vol. 40, No. 13, Published Mar. 14, 2007, 26 pgs. DOI 10.1088/1751-8113/40/13/013.

Nikolas P Breuckmann et al., "Hyperbolic and semi-hyperbolic surface codes for quantum storage", Quantum Science and Technology, vol. 2, No. 3, Published Aug. 2, 2017, 21 pgs. DOI 10.1088/2058-9565/aa7d3b.

R Raussendorf et al., "Topological fault-tolerance in cluster state quantum computation", New Journal of Physics, The open-access journal for physics, Received Feb. 16, 2007, Published Jun. 29, 2007, 25 pgs. doi:10.1088/1367-2630/9/6/199.

Aleksander Kubica et al., "Three-Dimensional Color Code Thresholds via StatisticalMechanical Mapping", Phys. Rev. Lett. 120, 180501—Published May 4, 2018, 7 pgs. DOI: 10.1103/PhysRevLett.120.180501.

Nickerson et al., Non-Final Office Action, U.S. Appl. No. 17/971,368, filed Sep. 1, 2023, 9 pgs.

Nickerson et al., Notice of Allowance, U.S. Appl. No. 16/979,829, filed Mar. 25, 2024, 15 pgs.

Kubica, Aleksander Marek, "The ABCs of the Color Code: A Study of Topological Quantum Codes as Toy Models for Fault-Tolerant Quantum Computation and Quantum Phases of Matter", California Institute of Technology ProQuest Dissertations Publishing, 2018, Defended Jun. 8, 2017, 205 pgs. 30553871. DOI:10.7907/059V-MG69.

Campbell, Earl T., Barbara M. Terhal, and Christophe Vuillot. "Roads towards fault-tolerant universal quantum computation." Nature 549.7671 (2017): 172-179, Nov. 12, 2018, 9 pgs.

Nautrup, Hendrik Poulsen, and Tzu-Chieh Wei. "Symmetry-protected topologically ordered states for universal quantum computation." Physical Review A 92.5 (2015): 052309, Published Nov. 9, 2015, 20 pgs.

Nickerson et al., Notice of Allowance, U.S. Appl. No. 17/013,192, filed Mar. 22, 2024, 14 pgs.

* cited by examiner

500

```
┌─────────────────────────────────────────────────────────────┐
│ Receive, at an input of a first set of photonic modes, a    │
│ first set of photons in distinct photonic modes of the      │──502
│ first set of photonic modes. The first set of photons       │
│ includes at least four photons. Each mode of the first set  │
│ of photonic modes is coupled to a respective mode of a      │
│ second set of photonic modes.                               │
└─────────────────────────────────────────────────────────────┘
                              │
                              ▼
┌─────────────────────────────────────────────────────────────┐
│ Receive, at an input of a third set of photonic modes, a    │
│ second set of photons in distinct photonic modes of the     │
│ third set of photonic modes. The second set of photons      │──506
│ includes at least one. Each mode of the third set of        │
│ photonic modes is coupled to a respective mode of the       │
│ second set of photonic modes.                               │
└─────────────────────────────────────────────────────────────┘
                              │
                              ▼
┌─────────────────────────────────────────────────────────────┐
│ Provide, at an output of the second set of photonic modes,  │──510
│ a third set of photons to one or more photon detectors.     │
└─────────────────────────────────────────────────────────────┘
                              │
                              ▼
┌─────────────────────────────────────────────────────────────┐
│ Provide, at an output of the third set of photonic modes,   │──512
│ a fourth set of photons to the one or more photon detectors.│
└─────────────────────────────────────────────────────────────┘
                              │
                              ▼
```

FIG. 5A

GENERATION OF ENTANGLED PHOTONIC STATES

CROSS REFERENCE TO RELATED APPLICATIONS

This Application is a United States National Stage Application filed under 35 U.S.C. § 371 of PCT Patent Application Serial No. PCT/US2019/045563 filed on Aug. 7, 2019, which claims the benefit of and priority to U.S. Patent Application No. 62/715,607 filed on Aug. 7, 2018, each of which is hereby incorporated by reference in its entirety.

TECHNICAL FIELD

This relates generally to photonic devices (or hybrid electronic/photonic devices) and, more specifically, to photonic devices (or hybrid electronic/photonic devices) for generating entangled photonic states (e.g., as resources for quantum computing, quantum metrology, and other quantum information processing tasks).

BACKGROUND

Quantum computers are computers that make use of quantum-mechanical phenomena. In classical computing, information is represented as bits of logical values. Quantum computing, in contrast, makes use of quantum bits (called "qubits"). While the state of a classical bit is constrained to being one of the permitted logical values (e.g., a zero or a one), qubits can make use of the quantum-mechanical phenomenon of superposition, and thereby have a state that is a superposition of logical values. Certain algorithms, such as Shor's prime factorization algorithm, take advantage of superposition and interference to speed up computational tasks. Thus, quantum computing promises a new paradigm of computation where information is processed in a way that has no classical analogue.

One of the main barriers to widespread use of quantum computing is the reliable generation and maintenance of resources. For example, many quantum computing algorithms require clusters of qubits. These qubits need to be in a particular type of superposition, known as an entangled state. However, various problems that either inhibit the generation of entangled states or destroy the entanglement once created (e.g., such as de-coherence) have frustrated advancements in quantum computing. Accordingly, there is a need for methods and devices that generate and maintain entangled states of qubits.

SUMMARY

Some embodiments described herein use single-photons as the basis for qubits (e.g., each qubit is encoded in a degree of freedom of a single-photon, such as the single-photon's polarization, or the degrees of freedom of a resource constructed from several single-photons). Using integrated optics, single-photons can be made to have low de-coherence rates, thus solving the problem of maintenance of entangled states once created. However, it is not possible, in general, to perform deterministic manipulation of single-photons. Thus, generation of entangled states based on single-photons is a probabilistic process rather than a deterministic one.

The above deficiencies and other related problems are reduced or eliminated by the methods and devices described herein for generating entangled photonic states. In particular, the embodiments described herein include methods and devices for generating entangled states of photons. These methods have a higher probability of success and/or use fewer photons as compared with conventional methods and devices for generating entangled photonic states. Because generating single-photons is itself a probabilistic process, using fewer photons to generate the same size photonic state leads to increased efficiency.

To that end, the present disclosure provides a method of obtaining a pair of photons in a Bell state. The method includes receiving, at an input of a first set of photonic modes, a first set of photons in distinct photonic modes of the first set of photonic modes. The first set of photons includes at least four photons. Each mode of the first set of photonic modes is coupled to a respective mode of a second set of photonic modes. The method further includes receiving, at an input of a third set of photonic modes, a second set of photons in distinct photonic modes of the third set of photonic modes. The second set of photons includes at least one photon. Each mode of the third set of photonic modes is coupled to a respective mode of the second set of photonic modes. The method further includes providing, at an output of the second set of photonic modes, a third set of photons to one or more photon detectors. The method further includes providing, at an output of the third set of photonic modes, a fourth set of photons to the one or more photon detectors. The method further includes outputting, at an output of the first set of photonic modes, a first photon and a second photon that are in a Bell state.

Further, the present disclosure provides a device for obtaining a pair of photons in a Bell state. The device includes one or more photon detectors. The device further includes a plurality of sets of photonic modes. The plurality of sets of photonic modes includes a first set of photonic modes configured for outputting a first set of photons. The first set of photonic modes is coupled with one or more photon sources. The first set of photonic modes includes at least four photonic modes. The plurality of sets of photonic modes further includes a second set of photonic modes coupled with the one or more photon detectors to provide a second set of photons to the one or more photon detectors. The second set of photonic modes includes at least four photonic modes. The plurality of sets of photonic modes further includes a third set of photonic modes coupled with the one or more photon sources and coupled with the one or more photon detectors to provide a third set of photons to the one or more photon detectors. The third set of photonic modes includes at least two photonic modes. The device further includes a first set of couplers coupling each mode of the first set of photonic modes to a respective mode of the second set of photonic modes. The device further includes a second set of couplers coupling each mode of the third set of photonic modes to a respective mode of the second set of photonic modes. The first set of couplers and the second set of couplers are configured to cause the first set of photonic modes to output, with a first non-zero probability, a pair of photons in a Bell state when a first number of photons is provided to respective inputs of the first set of photonic modes and the third set of photonic modes.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 5A-5D illustrate a method of generating one or more pairs of photons in a Bell state, in accordance with some embodiments.

DETAILED DESCRIPTION

Figure 1:
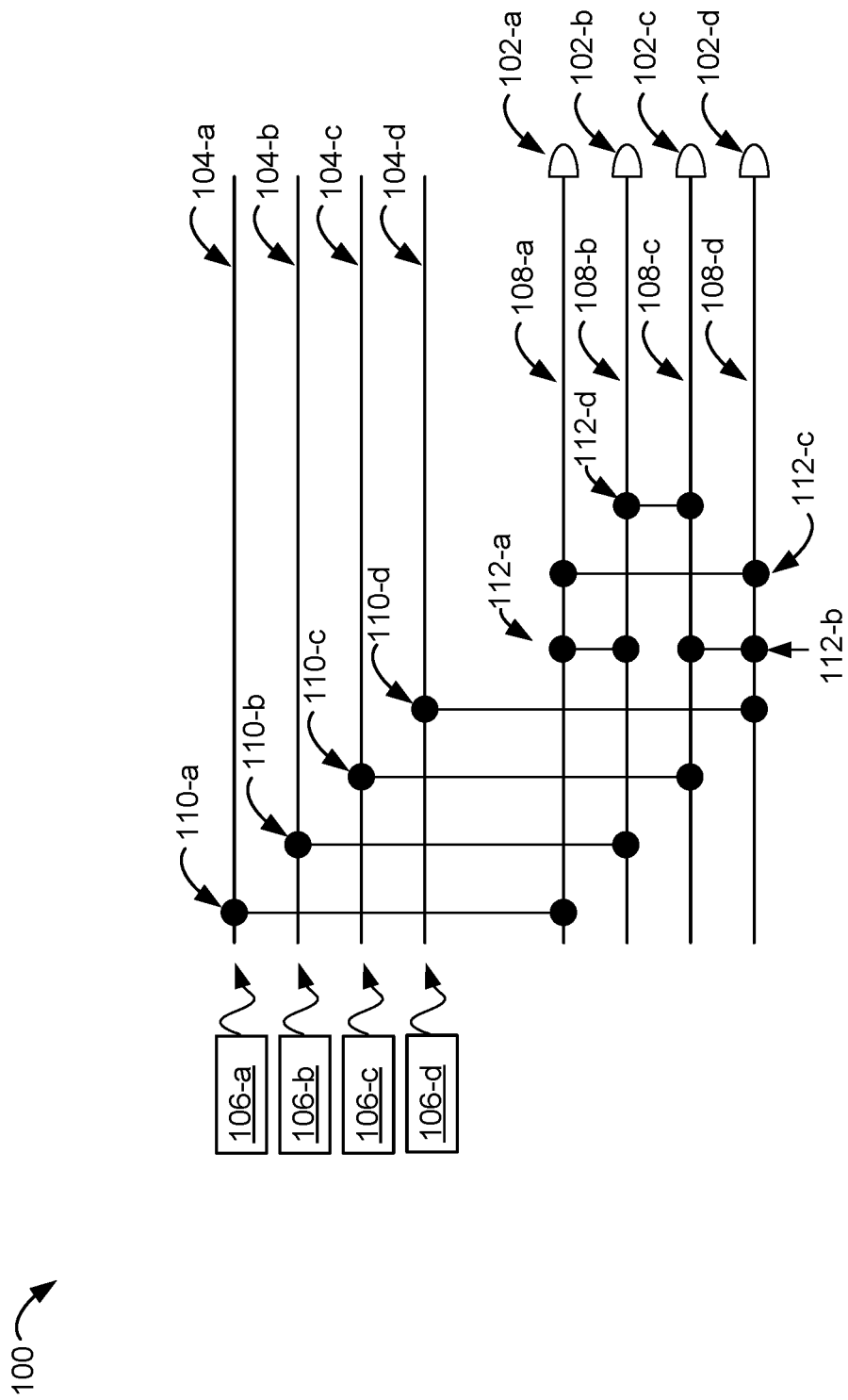
FIG. 1 illustrates a schematic diagram of a device for obtaining a pair of photons in a Bell state (also referred to herein as a "Bell pair").

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The dynamics of quantum objects, e.g., photons, electrons, atoms, ions, molecules, nanostructures, and the like, follow the rules of quantum theory. More specifically, in quantum theory, the quantum state of a quantum object, e.g., a photon, is described by a set of physical properties, the complete set of which is referred to as a mode. In some embodiments, a mode is defined by specifying the value (or distribution of values) of one or more properties of the quantum object. For example, again for photons, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields) and the like.

For the case of photons propagating in a waveguide, it is convenient to express the state of the photon as one of a set of discrete spatio-temporal modes. For example, the spatial mode $k_i$ of the photon is determined according to which one of a finite set of discrete waveguides the photon can be propagating in. Furthermore, the temporal mode $t_j$ is determined by which one of a set of discrete time periods (referred to herein as "bins") the photon can be present in. In some embodiments, the temporal discretization of the system can be provided by the timing of a pulsed laser which is responsible for generating the photons. In the examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Furthermore, in the description that follows, embodiments will be described that employ photonic waveguides to define the spatial modes of the photon. However, one of ordinary skill having the benefit of this disclosure will appreciate that any type of mode, e.g., polarization modes, temporal modes, and the like, can be used without departing from the scope of the present disclosure.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. Because modes are the complete set of properties, this description is sufficient. For example, a multi-mode, two particle Fock state $|1001\rangle_{1,2,3,4}$ specifies a two-particle quantum state with one photon in mode 1, zero photons in mode 2, zero photons in mode three, and 1 photon in mode four. Again, as introduced above, a mode can be any set of properties of the quantum object (and can depend on the single particle basis states being used to define the quantum state). For the case of the photon, any two modes of the electromagnetic field can be used, e.g., one may design the system to use modes that are related to a degree of freedom that can be manipulated passively with linear optics. For example, polarization, spatial degree of freedom, or angular momentum, could be used. For example, the four-mode system represented by the two particle Fock state $|1001\rangle_{1,2,3,4}$ can be physically implemented as four distinct waveguides with two of the four waveguides (representing mode 1 and mode 4, respectively) having one photon traveling within them. Other examples of a state of such a many-body quantum system are the four photon Fock state $|1111\rangle_{1,2,3,4}$ that represents each waveguide containing one photon and the four photon Fock state $|2200\rangle_{1,2,3,4}$ that represents waveguides one and two respectively housing two photons and waveguides three and four housing zero photons. For modes having zero photons present, the term "vacuum mode" is used. For example, for the four photon Fock state $|2200\rangle_{1,2,3,4}$ modes 3 and 4 are referred to herein as "vacuum modes."

As used herein, a "qubit" (or quantum bit) is a physical quantum system with an associated quantum state that can be used to encode information. Qubits, in contrast to classical bits, can have a state that is a superposition of logical values such as 0 and 1. In some embodiments, a qubit is "dual-rail encoded" such that the logical value of the qubit is encoded by occupation of one of two modes by exactly one photon (a single photon). For example, consider the two spatial modes of a photonic system associated with two distinct waveguides. In some embodiments, the logical 0 and 1 values can be encoded as follows:

$$|0\rangle_L = |10\rangle_{1,2} \qquad (1)$$

$$|1\rangle_L = |01\rangle_{1,2} \qquad (2)$$

where the subscript "L" indicates that the ket represents a logical value (e.g., a qubit value) and, as before, the notation $|ij\rangle_{1,2}$ on the right-hand side of the Equations (1)-(2) above indicates that there are i photons in a first waveguide and j photons in a second waveguide, respectively (e.g., where i and j are integers). In this notation, a two qubit state having a logical value $|01\rangle_L$ (representing a state of two qubits, the first qubit being in a '0' logical state and the second qubit being in a '1' logical state) may be represented using photon occupations across four distinct waveguides by $|1001\rangle_{1,2,3,4}$ (i.e., one photon in a first waveguide, zero photons in a second waveguide, zero photons in a third waveguide, and one photon in a fourth waveguide). In some instances, throughout this disclosure, the various subscripts are omitted to avoid unnecessary mathematical clutter.

A Bell pair is a pair of qubits in any type of maximally entangled state referred to as a Bell state. For dual rail encoded qubits, examples of Bell states include:

$$|\Phi^+\rangle = \frac{|0\rangle_L|0\rangle_L + |1\rangle_L|1\rangle_L}{\sqrt{2}} = \frac{|1010\rangle + |0101\rangle}{\sqrt{2}} \quad (3)$$

$$|\Phi^-\rangle = \frac{|0\rangle_L|0\rangle_L - |1\rangle_L|1\rangle_L}{\sqrt{2}} = \frac{|1010\rangle - |0101\rangle}{\sqrt{2}} \quad (4)$$

$$|\Psi^+\rangle = \frac{|0\rangle_L|1\rangle_L + |1\rangle_L|0\rangle_L}{\sqrt{2}} = \frac{|1001\rangle + |0110\rangle}{\sqrt{2}} \quad (5)$$

$$|\Psi^-\rangle = \frac{|0\rangle_L|1\rangle_L - |1\rangle_L|0\rangle_L}{\sqrt{2}} = \frac{|1001\rangle - |0110\rangle}{\sqrt{2}} \quad (6)$$

Although, the states $|X^+\rangle$ and $|X^-\rangle$ given below do not correspond to Bell states for path encoded qubits, swapping modes 2 and 3 transforms these states into $|\Phi^+\rangle$ and $|\Phi^-\rangle$, respectively. Therefore, in some embodiments, $|X^+\rangle$ and $|X^-\rangle$ are considered valid outcomes (i.e., successes) of the Bell state generators described herein.

$$|\chi^+\rangle = \frac{|0011\rangle + |1100\rangle}{\sqrt{2}} \quad (7)$$

$$|\chi^-\rangle = \frac{|0011\rangle - |1100\rangle}{\sqrt{2}} \quad (8)$$

As used herein, the term "quantum computing resource" is intended to include algorithmic resources as well as precursor resources (e.g., resources that are combined with other resources to form a larger resource, which may be an algorithmic resource). Algorithmic resources may include universal quantum computing states and/or error correcting code states.

FIG. 1 illustrates a schematic diagram (e.g., a photonic mode representation) of a device 100 for obtaining a pair of photons in a Bell state (also referred to herein as a "Bell pair"). In device 100, qubits are path encoded. The device 100 includes photon detectors 102-$a$ through 102-$d$ and a plurality of photonic modes 104.

In some embodiments, photonic modes 104 are waveguides. In some embodiments, the waveguides (and other optical components) described herein are implemented using integrated optics (e.g., waveguides on a silica chip). In contrast to bulk optics, which are inherently non-scalable and unreliable on a large scale, integrated optics provide stability and control over optical properties (such as path length), with the added advantage that the device size is dramatically reduced as compared to analogous circuits constructed using bulk optics.

Further, unless otherwise stated, a first waveguide and a second waveguide may be respective portions of a larger (or longer) waveguide. For example, a first waveguide and a second waveguide coupled with the first waveguide may be portions (e.g., lengths or segments) of a single microphotonic (e.g., integrated) waveguide fabricated on a chip.

Returning to FIG. 1, the plurality of sets of modes includes a set of modes 104 (e.g., mode 104-$a$ through mode 104-$d$) configured for outputting a first set of photons (e.g., modes 104 are not coupled to the one or more photon detectors 102 so that photons remaining in the modes 104 after operation of device 100 are output to downstream circuitry). In this example, the set of photonic modes 104 includes four photonic modes (e.g., photonic modes 104-$a$ through 104-$d$).

The set of modes 104 (also called the output modes) for outputting the set of photons is coupled with one or more photon sources 106 (e.g., photon sources 106-$a$ through 106-$d$). In some embodiments, the one or more photon sources 106 are single-photon sources. Single-photon sources are photon sources that, at least probabilistically, output exactly one photon per attempt. As used herein, a single-photon source refers to a light source that is configured to, at least probabilistically, output a single-photon at a respective time. A single-photon source need not output a single-photon every time there is an attempt to generate a single-photon (e.g., the success probability may be less than 100%). In some embodiments, the single-photons generated by a single-photon source are heralded, meaning that a single-photon source generates more than one photon (e.g., two photons) but includes a mechanism to output (e.g., emit to external optics) only a single-photon of the generated photons (e.g., a single-photon source concurrently generates two photons and detects a first photon of the two photons as a confirmation of the photon generation and emits a second photon of the two photons, thereby outputting only a single-photon). As used herein, generating a photon includes converting energy (e.g., electric, magnetic, mechanical, thermal, and/or optical) into light. For example, a photon may be generated from an electro-optical element (e.g., a semiconductor device, such as a light emitting diode and/or a chemical element, such as an organic compound) or from an optical conversion process (e.g., four-wave mixing, spontaneous parametric down conversion, etc.).

The plurality of sets of modes includes a set of modes 108 (e.g., waveguides) coupled with the one or more photon detectors 102. The set of modes 108 is configured to provide a second set of photons to the one or more photon detectors 102 (e.g., modes 108 are referred to as "detection modes"). In this example, the set of photonic modes 108 includes four photonic modes (e.g., photonic modes 108-$a$ through 108-$d$). In some embodiments, there are fewer physical detectors than modes 108 (e.g., a respective detector detects photons in a plurality of detected modes). For example, detectors 102-$a$ through detectors 102-$d$ may be embodied as a single detector that can distinguish between a photon in the various modes 108 (e.g., a mode-resolving detector, such as a polarization-sensitive mode detector). In some embodiments, detectors 102-$a$ through 102-$d$ are embodied as two detectors (e.g., modes 108-$a$ and 108-$b$ correspond to horizontal and vertical polarizations in a first waveguide, and the detector 102-$a$ and 102-$b$ are embodied as a first single detector with polarization sensitivity; and modes 108-$c$ and 108-$d$ correspond to horizontal and vertical polarizations in a second waveguide, and the detector 102-$c$ and 102-$d$ are embodied as a second single detector with polarization sensitivity). In some embodiments, four separate detectors are used for detectors 102-$a$ through 102-$d$ (e.g., a separate detector is used for each detected mode).

The device 100 further includes a set of couplers 110 (e.g., couplers 110-$a$ through 110-$d$) coupling each mode of the set of photonic modes 104 to a respective mode of the set of photonic modes 108. For example, coupler 110-$a$ couples mode 104-$a$ to mode 108-$a$; coupler 110-$b$ couples mode 104-*b* to mode 108-*b*; coupler 110-*c* couples mode 104-*c* to mode 108-*c*; and coupler 110-*d* couples mode 104-*a* to mode 108-*d*.

In this context, a coupler (e.g., mode coupler) represents a gate (e.g., a mathematical operator) that acts on a photon in a first mode so that the photon is at least partially in a second mode after operation of the gate. For example, when a photon in a first mode is acted on by a coupler that splits photons between the first mode and a second mode, the result of the coupler acting on the photon is that the photon is superposed between the first mode and the second mode. Representing a coupler as a gate O the effect of a coupler that couples a mode A to a mode B is:

$$O|A\rangle = a|A\rangle + b|B\rangle. \quad (9)$$

In the Equation above, $a^2+b^2=1$. However, generally speaking, a coupler can shift an arbitrary amount of a photon's state from the first mode to the second mode, so that $0 > a \geq 1$. In some embodiments, the couplers described herein are assumed to split a photon equally between two modes, such that $a^2=b^2=0.5$.

In some circumstances, couplers 110 are physically embodied as elements that include beam splitters (e.g., a device that splits a photon between two waveguides). For example, when a photon in a first waveguide is acted on by a beam splitter that splits photons between the first waveguide and a second waveguide, the result of the beam splitter acting on the photon is that the photon is in a superposition between the first waveguide and the second waveguide.

The device 100 further includes a set of couplers 112 (e.g., couplers 112-*a* through 112-*d*). Set of couplers 112 acts as a "scrambler" such that, when a photon is input onto each respective mode 108 before reaching the set of couplers 112, the photons are distributed across the set of modes 108 after being acted on by the set of couplers 112 (e.g., from downstream of set of couplers 112, one cannot tell by detecting a photon in a particular mode 108 (e.g., mode 108-*c*) which mode the photon was in before being acted upon by the set of couplers 112). To that end, set of couplers 112 includes a coupler 112-*a* that couples mode 108-*a* to 108-*b*; coupler 112-*b* that couples mode 108-*c* to 108-*d*; coupler 112-*c* that couples mode 108-*a* to mode 108-*d*; and coupler 112-*d* that couples mode 108-*b* to mode 108-*c*.

The sets of couplers 110/112 are configured to cause the set of output modes 104 to output, with a non-zero predetermined probability, a pair of photons in a Bell state when a first (predefined, non-zero) number of photons is provided to respective inputs of the set of modes 104 (e.g., four single-photons). For example, when the first number of photons is four, detection of a single-photon in each of two different modes 108 heralds success with probability $3/16 = 18.75\%$ (e.g., where success is considered to be generation of a Bell pair or generation of a state that can be deterministically converted to a Bell pair). In particular, given an input of four single-photons (one on each mode 104), there is a $1/16$ probability of detecting a set of two photons on distinct detection modes 108 that heralds $(|1100\rangle + |0011\rangle)/\sqrt{2}$, which can be deterministically converted to $|\Phi^+\rangle$ (defined above) by swapping the second and third modes (e.g., swapping the photons in the second and third modes). In addition, there is a $1/16$ probability of detecting a set of two photons on distinct detection modes 108 that heralds $|\Phi^+\rangle$ and a $1/16$ probability of detecting a set of two photons on distinct detection modes 108 that heralds $|\Psi^+\rangle$. The sum of the three $1/16$th probabilities gives rise to the $3/16$ probability of success.

Figure 2:
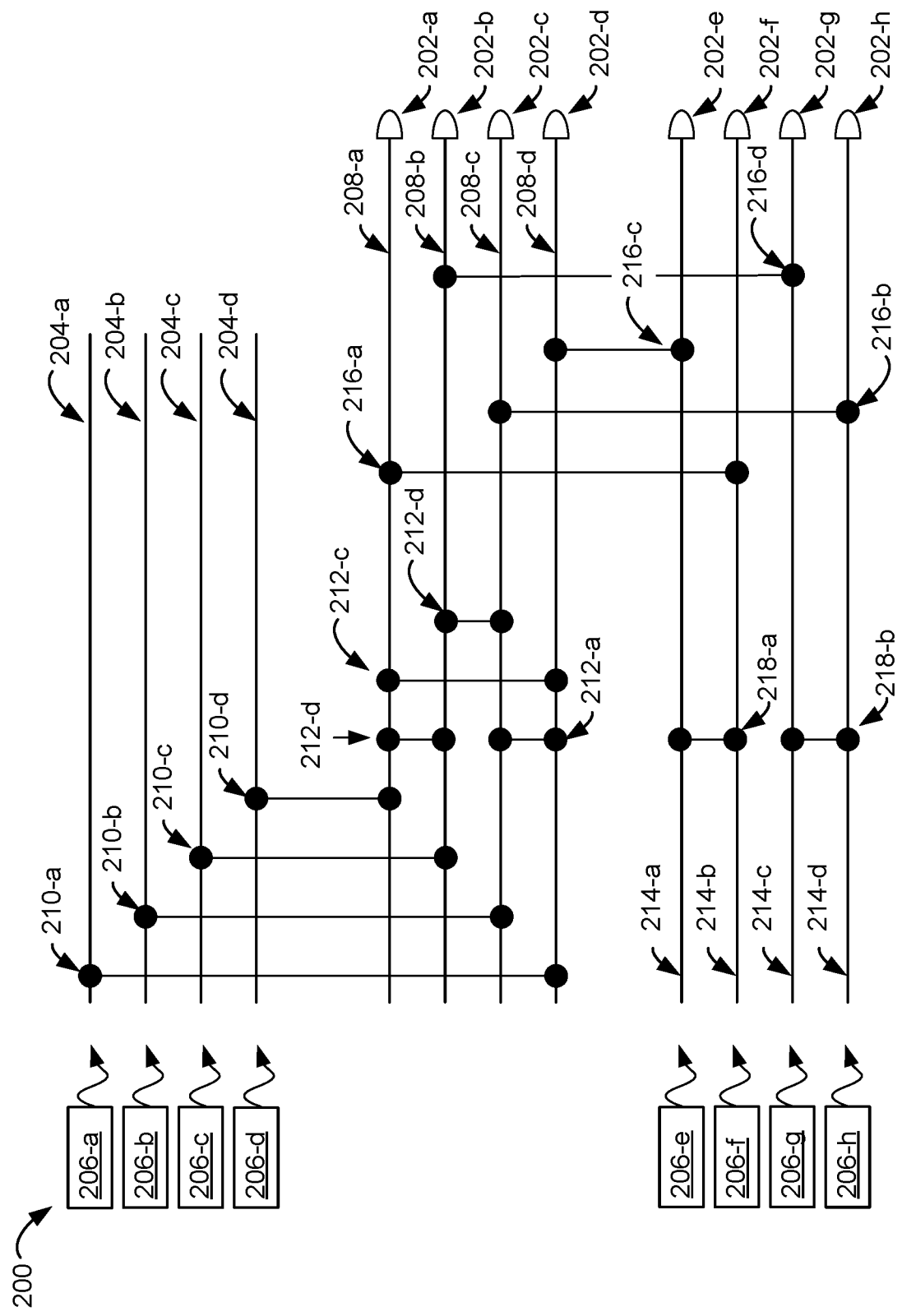
FIG. 2 illustrates a schematic diagram of a device for obtaining a pair of photons in a Bell state, in accordance with some embodiments.

FIG. 2 illustrates a schematic diagram (e.g., a photonic mode representation) of a device 200 for obtaining a pair of photons in a Bell state (also referred to herein as a "Bell pair"), in accordance with some embodiments. Device 200 is analogous to device 100, described with reference to FIG. 1, except for the differences noted below. In particular, device 200 includes an extra set of modes (e.g., set of modes 214, described below). The extra set of modes is configured to both receive photons from photon sources (e.g., is coupled with single-photon sources to receive photons from said single photon sources) and configured, after appropriate coupling to the other sets of modes, to output photons to a set of detectors. Assuming that a full set of photons is input on a first set of modes (e.g., set of modes 204, analogous to modes 104, FIG. 1), device 200 operates as follows: when no photons are input onto the extra set of modes, device 200 operates as a Bell pair generator that is analogous to device 100 with the same success probability of 18.75%; when two photons are input onto the extra set of modes, device 200 operates as a Bell pair generator with a success probability of $13/64 = 20.3125\%$; when four photons are input onto the extra set of modes, device 200 operates as a Bell pair generator with a success probability of $7/32 = 21.875\%$. Thus, device 200 has an improved efficiency for generating Bell pairs, as compared to device 100, when additional single-photons are available, and does no worse than device 100 when only four single-photons are available.

For example, when four photons are provided to device 200 (e.g., when no photons are input onto the extra set of modes), a pair of photons on the output modes having a state $(|0011\rangle + |1100\rangle)/\sqrt{2}$ is heralded by: a single photon detected by detector 202-*a* and a single photon by detector 202-*e*; and no other photons being detected. The same state is heralded by: a single photon detected on detector 202-*g*; a single photon being detected by 202-*h*; and no other photons detected.

Device 200 includes one or more photon detectors 202 (e.g., photon detectors 202-*a* through 202-*h*). Photon detectors 202 are analogous to photon detectors 102, described with reference to FIG. 1.

Device 200 further includes a plurality of sets of photonic modes (e.g., a plurality of sets of waveguides). The plurality of sets of photonic modes include a first set of photonic modes 204 configured for outputting a first set of photons. In this example, there are four modes in the first set of modes 204 (e.g., modes 204-*a* through 204-*d*). The first set of photonic modes 204 is coupled with one or more photon sources 206. The first set of photonic modes 204 includes at least four photonic modes (e.g., exactly four photonic modes).

Device 200 further includes a second set of photonic modes 208 coupled with the one or more photon detectors 202 to provide a second set of photons to the one or more photon detectors. The second set of photonic modes includes at least four photonic modes (e.g., exactly four photonic modes). In some embodiments, four photonic modes 208 (e.g., photonic modes 208-*a* through 208-*d*) are each carried by a distinct waveguide. In some embodiments, the second set of photonic modes 208 is not coupled with a photon source 206.

Device 200 further includes a third set of photonic modes 214 coupled with the one or more photon sources 206 and coupled with the one or more photon detectors 202 to provide a third set of photons to the one or more photon detectors 202. The third set of photonic modes 214 includes at least two photonic modes. In some embodiments, the third set of photonic modes 214 includes four photonic modes. In this example, the third set of photonic modes 214 includes exactly four photonic modes (e.g., photonic modes 214-*a* through 214-*d*). In some embodiments, each photonic mode 214 is carried by a distinct waveguide.

Device 200 further includes a first set of couplers 210 coupling each mode of the first set of photonic modes 204 to a respective mode of the second set of photonic modes 208. In some embodiments, each mode of the first set of modes 204 is coupled to one mode (e.g., exactly one mode) of the second set of photonic modes 208. In some embodiments, each mode of the second set of modes 208 is coupled to one mode (e.g., exactly one mode) of the first set of photonic modes 204.

Device 200 further includes a second set of couplers 216 coupling each mode of the third set of photonic modes 214 to a respective mode of the second set of photonic modes 208. In some embodiments, each mode of the second set of modes 208 is coupled to one mode (e.g., exactly one mode) of the third set of photonic modes 214. In some embodiments, each mode of the third set of modes 214 is coupled to one mode (e.g., exactly one mode) of the second set of photonic modes 208.

The first set of couplers 210 and the second set of couplers 216 are configured (e.g., by their arrangement in coupling the first, second, and third sets of modes, namely which modes are coupled to which) to cause the first set of photonic modes 204 to output, with a first non-zero predetermined probability, a pair of photons in a Bell state when a first number of photons is provided to respective inputs of the first set of photonic modes 204 and the third set of photonic modes 214. For example, when four photons are provided to the first set of photonic modes 204 from photon sources 206, and zero photons are provided to the third set of photonic modes 214 from photon sources 206 (so that the first number of photons is four), the first non-zero predetermined probability is 3/16=18.75% (e.g., device 200 operates as if the additional third set of photonic modes 214, as compared to device 100, were not present, with the same success probability). When four photons are provided to the first set of photonic modes 204 from photon sources 206, and zero photons are provided to the third set of photonic modes 214 from photon sources 206, success is heralded (indicated) by detection of two photons in distinct modes 208/214 by detectors 202.

In some embodiments, the first set of couplers 210 and the second set of couplers 216 are configured to cause the first set of photonic modes 204 to output, with a second non-zero predetermined probability different from the first non-zero probability, a pair of photons in a Bell state when a second number of photons different from the first number of photons is provided to respective inputs of the first set of photonic modes 204 and the third set of photonic modes 214. For example, when four photons are provided to the first set of photonic modes 204 from photon sources 206, and two photons are provided to the third set of photonic modes 214 from photon sources 206 (so that the second number of photons is six), the second non-zero predetermined probability is 13/64=20.3125% (e.g., device 200 operates with a higher success rate, as compared to device 100, when two additional single-photons are available). When four photons are provided to the first set of photonic modes 204 from photon sources 206, and two photons are provided to the third set of photonic modes 214 from photon sources 206, success is heralded (indicated) by detection of four photons in distinct modes 208/214 by detectors 202.

In some embodiments, the first set of couplers 210 and the second set of couplers 216 are configured to cause the first set of photonic modes 204 to output, with a third non-zero predetermined probability different from the first non-zero probability and the second non-zero probability, a pair of photons in a Bell state when a third number of photons different from the first number of photons and the second number of photons is provided to respective inputs of the first set of photonic modes 204 and the third set of photonic modes 214. For example, when four photons are provided to the first set of photonic modes 204 from photon sources 206, and four photons are provided to the third set of photonic modes 214 from photon sources 206 (so that the third number of photons is eight), the third non-zero predetermined probability is 7/32=21.875%. When four photons are provided to the first set of photonic modes 204 from photon sources 206, and four photons are provided to the third set of photonic modes 214 from photon sources 206, success is heralded (indicated) by detection of six photons in distinct modes 208/214 by detectors 202.

Thus, device 200 operates with a higher success rate when more photons are available, but is otherwise configured to work with however many photons are available. However, in some embodiments, providing an odd number of photons to the inputs of photonic modes 204/208 decreases the success probability as compared to having one fewer photons (e.g., an even number of photons). Thus, in some embodiments, when an odd number of photons are available, one photon is discarded and the remaining even number of photons are provided to respective inputs of photonic modes 204/208.

In some embodiments, device 200 further includes a third set of couplers 212. The third set of couplers 212 comprises a "scrambler" that is analogous to the set of couplers 112 (FIG. 1). In particular, the third set of couplers 212 includes coupler 212-*a* that couples photonic mode 208-*a* to photonic mode 208-*b*; coupler 212-*b* that couples photonic mode 208-*c* to photonic mode 208-*d*; coupler 212-*c* that couples photonic mode 208-*a* to photonic mode 208-*d*; and coupler 212-*d* that couples photonic mode 208-*b* to photonic mode 208-*c*.

In some embodiments, device 200 includes a fourth set of couplers 218 that couples various modes of the third set of photonic modes 214. The fourth set of couplers 218 includes coupler 218-*a* that couples photonic mode 214-*a* to photonic mode 214-*b* and coupler 218-*b* that couples photonic mode 214-*c* to photonic mode 214-*d*.

Figure 3:
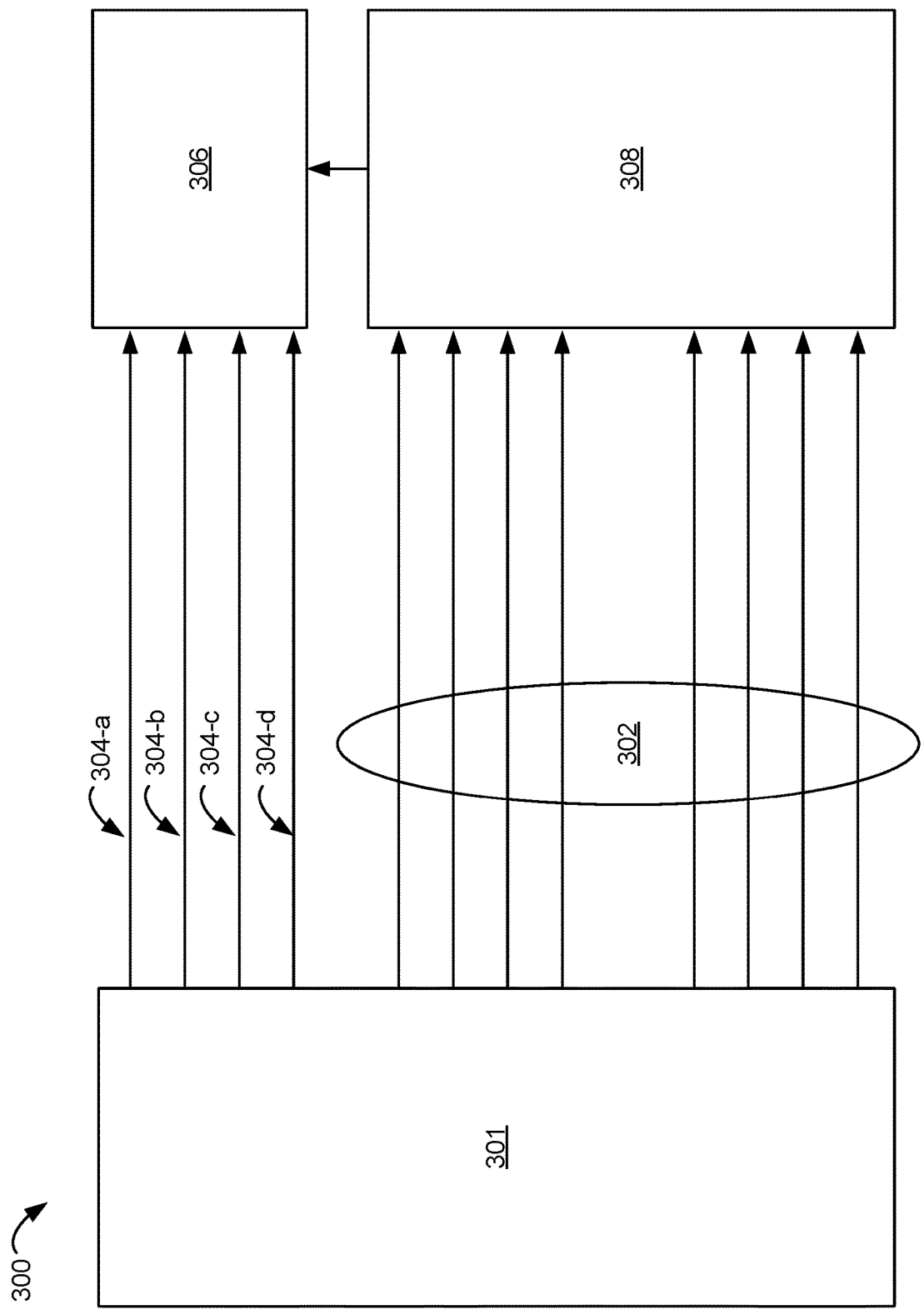
FIG. 3 illustrates a schematic diagram of a device for use in a quantum-computing architecture, in accordance with some embodiments.

FIG. 3 illustrates a schematic diagram of a device 300 for use in a quantum-computing architecture, in accordance with some embodiments. Device 300 includes a Bell pair generator 301, which may include or be embodied as either of device 100 (FIG. 1) or device 200 (FIG. 2). Bell pair generator 301 outputs photons on a set of output modes 304 (e.g., output modes 304-*a* through 304-*d*, which are analogous to output modes 204, FIG. 2) embodied by a set of waveguides (it is worth noting again that a single waveguide may carry multiple modes, and the drawings herein utilize a one-to-one ratio between modes and waveguides for ease of illustration and explanation).

Device 300 includes a set of electrical channels 302 (e.g., wires) that provide classical information from one or more photon detectors (e.g., detectors 202 internal to the Bell pair generator, FIG. 2, although it should be noted that, in some embodiments, the photon detectors may be external to Bell pair generator 301). In some embodiments, the classical information includes a detection pattern indicating which detection modes were detected following an attempt by Bell pair generator 301 to produce a Bell pair. In some embodiments, the classical information is sufficient to determine whether a Bell pair was produced and, if so, which Bell state the Bell pair is in. For example, in some embodiments, device 300 includes a respective electrical channel 302 corresponding to each detection mode within Bell pair generator 301, and each respective electrical channel 302 passes a logical value indicating whether the corresponding detection mode detected a photon. In some embodiments, in addition to what is shown in FIGS. 1-2, Bell pair generator 301 includes classical circuitry to, for example, serialize signals received from internal detectors. In such embodiments, the set of electrical channels 302 may be replaced by a data bus.

Device 300 further includes a classical computer (e.g., processor) 308 for determining, based on the information from the one or more photon detectors (e.g., via channels 302), whether photons output by the first set of photonic mode 304 include a pair of photons in a Bell state (and, optionally, which Bell state). In some embodiments, the classical computer is a field programmable gate array (FPGA) that is mounted on the same chip as Bell pair generator 301. In some embodiments, device 300 includes memory (e.g., processor memory) storing instructions, which when executed by the classical computer 308, cause the classical computer 308 to determine whether the photons output by the first set of photonic modes 304 include a pair of photons in a Bell state (and, optionally, which Bell state). In some embodiments, the memory comprises a non-transitory computer readable storage medium storing the instructions. In some embodiments, the memory includes a look-up table storing entries indicating which detection patterns herald Bell pairs (and, optionally, which Bell state) (e.g., the classical computer 308 receives the detection pattern via electrical channels 302 and is configured to look-up, in the look-up table, whether the detection pattern heralds a Bell pair).

In some embodiments, the classical computer 308 configures (e.g., the memory includes instructions that cause the classical computer 308 to configure) a quantum-computing circuit 306 (e.g., a linear-optical quantum computing circuit) in accordance with the determination as to whether photons output by the first set of photonic modes 304 include a pair of photons in a Bell state (and optionally which Bell state). In some embodiments, the quantum computing circuit 306 includes an optical multiplexer. In some embodiments, the quantum computing circuit 306 includes an entangled state generator (e.g., an optical circuit that receives Bell pairs and generates a larger entangled state, such as a Greenberger-Horne-Zeilinger (GHZ) state).

In some embodiments, upstream quantum circuitry (e.g., an upstream entangled state generator) is configured to receive, from modes 304, not only Bell pairs, but Bell pairs in a particular state (e.g., $|\Phi^+\rangle$). Thus, in some embodiments, quantum-computing circuit 306 is a remedial operator that changes the state of a pair of photons in modes 304 from one Bell state (e.g., $|\Phi^-\rangle$) to a different Bell state (e.g., $|\Phi^+\rangle$).

Figure 4:
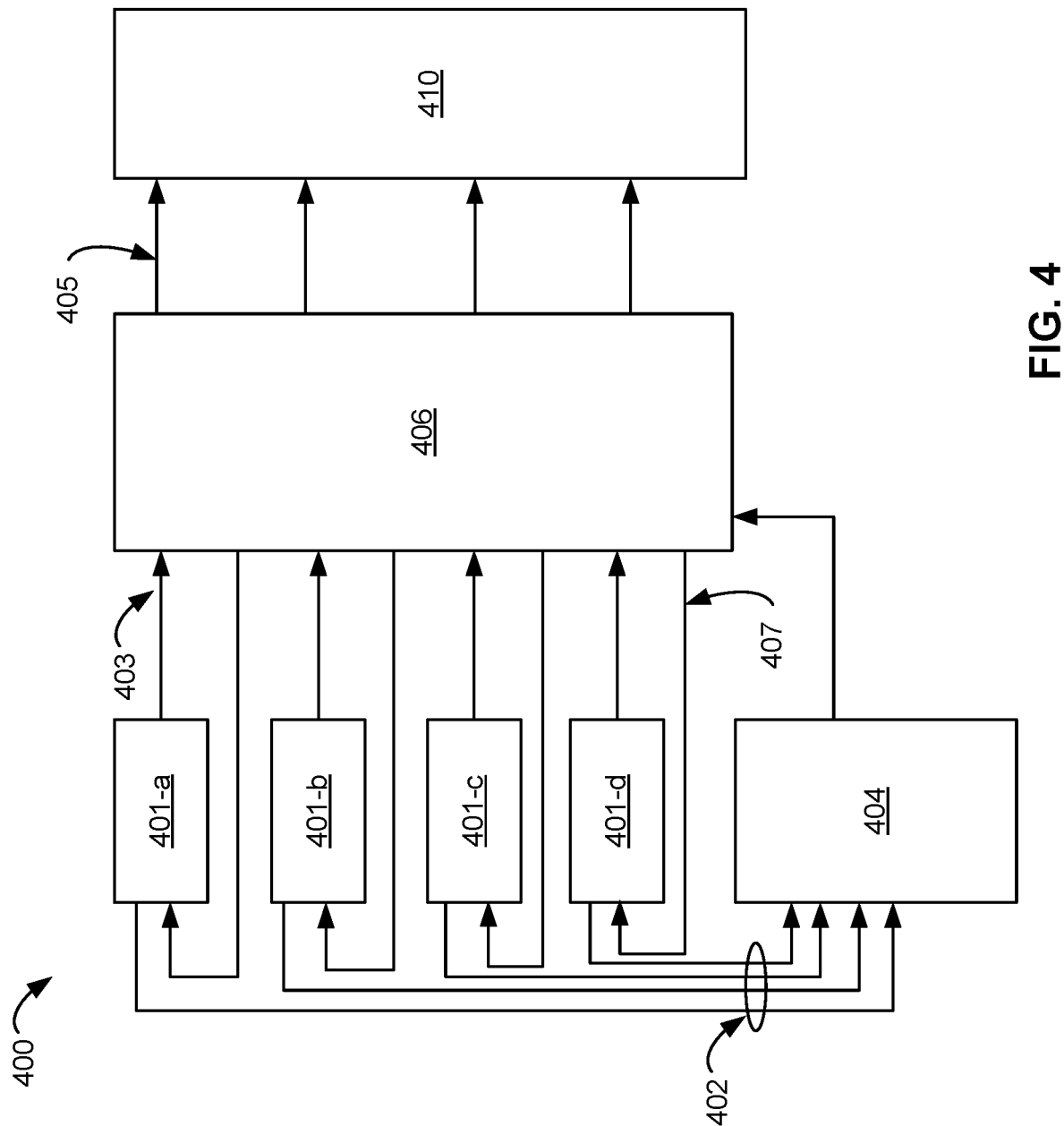
FIG. 4 illustrates a schematic diagram of a device for use in a quantum-computing architecture, in accordance with some embodiments.
Figure 5B:
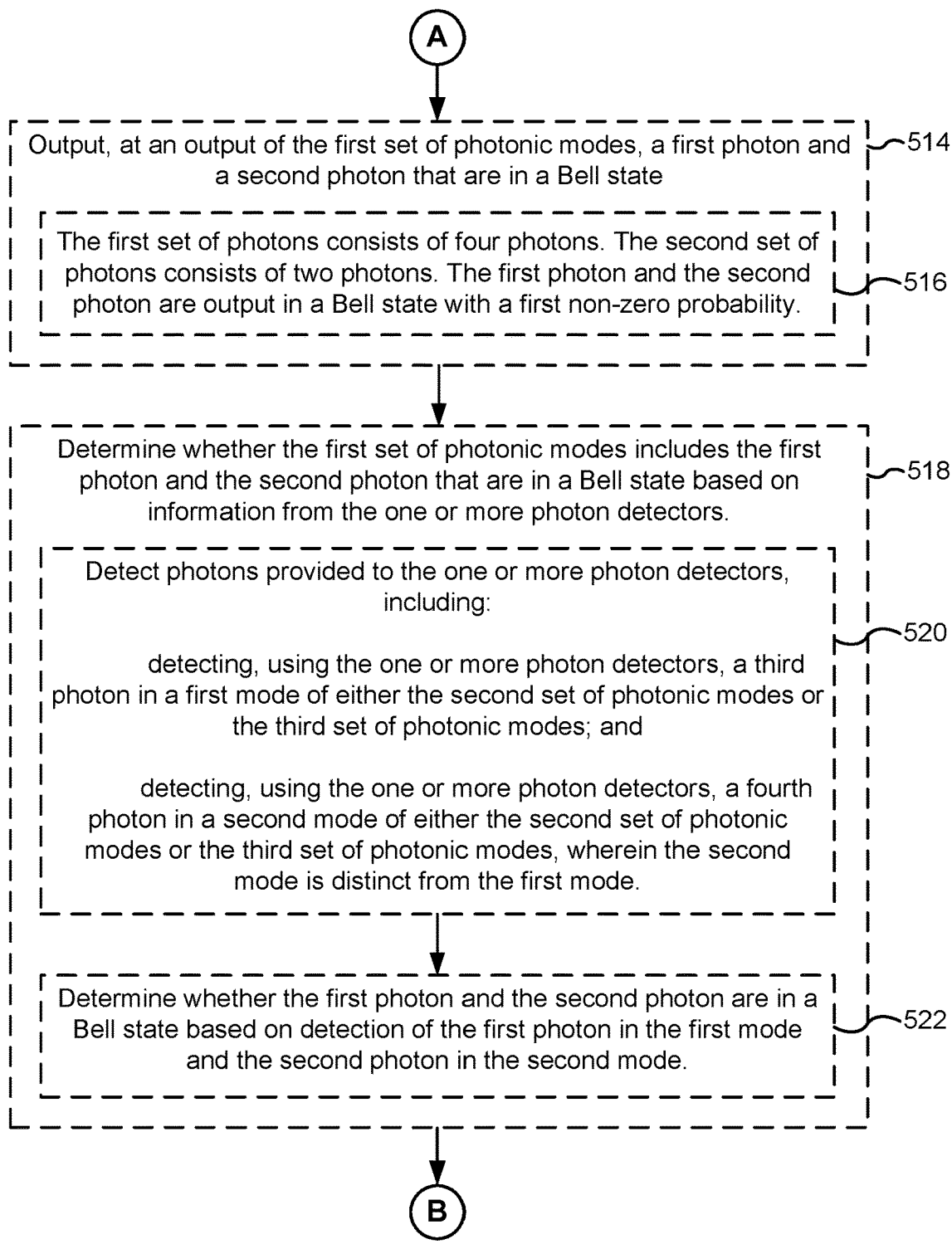
Figure 5C:
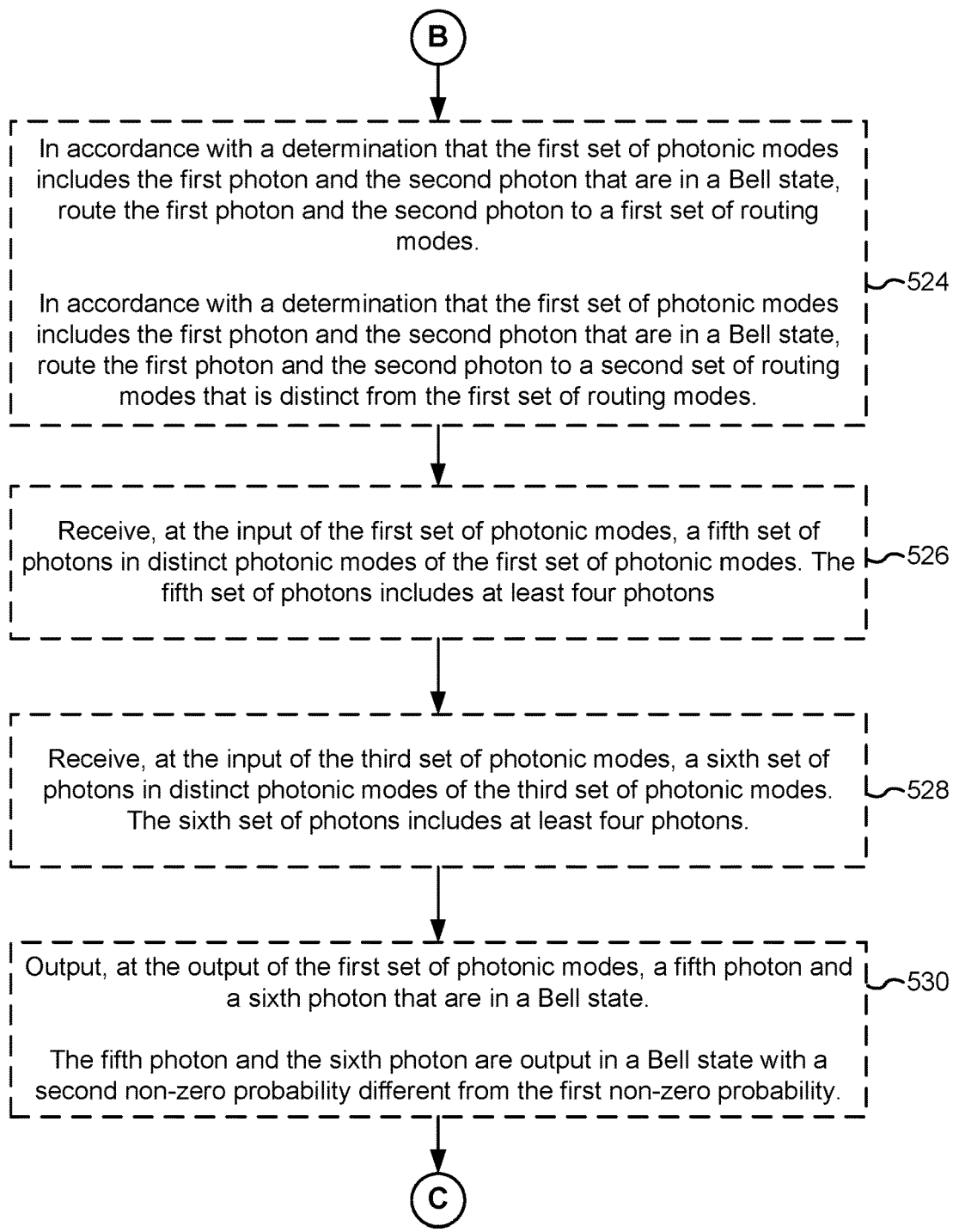
Figure 5D:
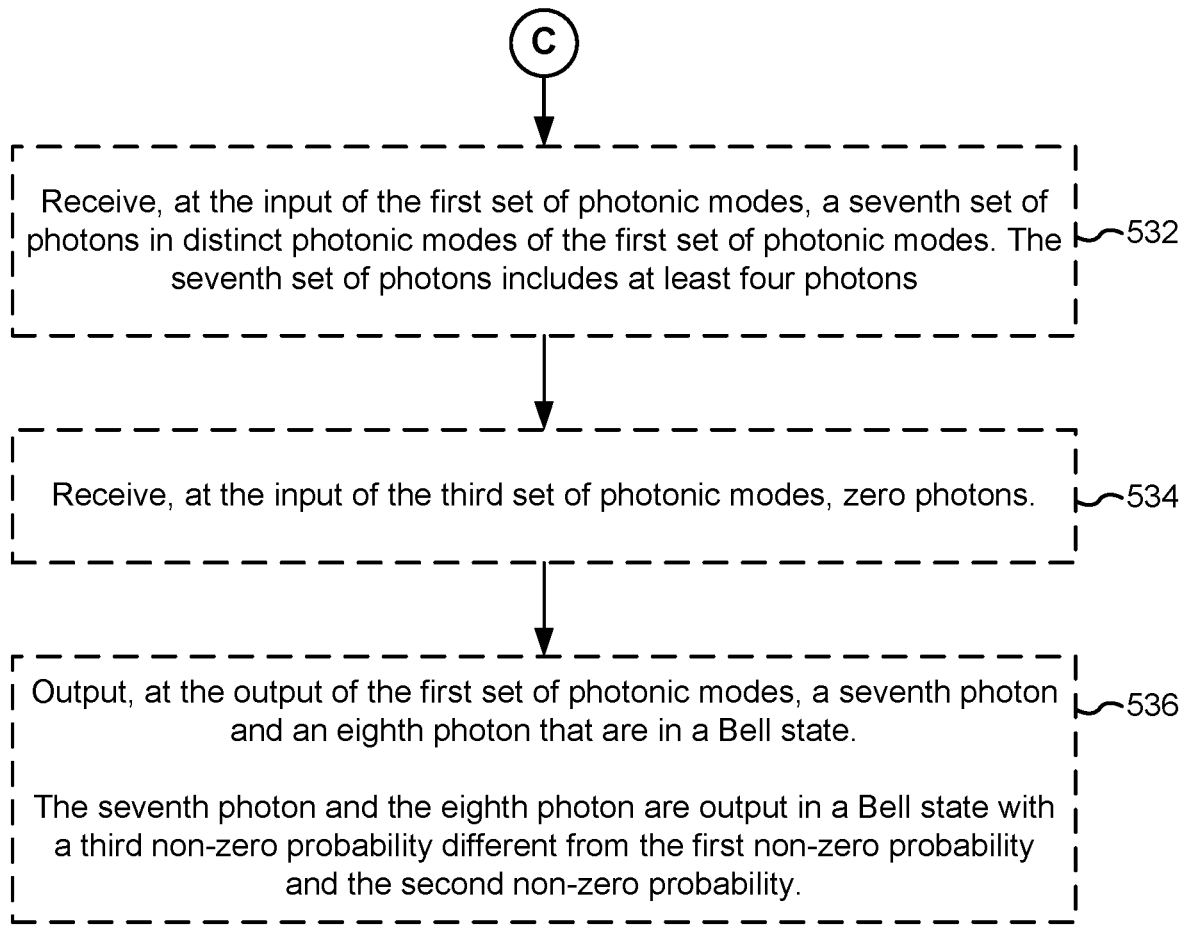

FIG. 4 illustrates a schematic diagram of a device 400 for use in a quantum-computing architecture, in accordance with some embodiments. Device 400 includes a set of Bell pair generators (e.g., a plurality of Bell pair generators) 401 (e.g., Bell pair generators 401-$a$ through 401-$d$). Each Bell pair generator 401 outputs a set of output modes 403 to a multiplexer 406. In FIG. 4, for visual clarity, only Bell pair generator 401-$a$'s output modes are labeled, and the single line may represent a plurality of modes as described with reference to previous drawings. A classical computer 404 (e.g., including one or more processors and memory) is coupled to the set of Bell pair generators 401 by a set of buses (or a plurality of sets of electrical channels) 402.

The buses 402 pass information from the Bell pair generators 401 to the classical computer 404 indicating which detection modes were present on a respective attempt to generate a Bell pair. For example, when each Bell pair generator 401 concurrently attempts to generate a Bell pair, in some circumstances, some of the Bell pair generators 401 will be successful and some will not. The detection patterns passed by buses 402 allow processor 404 to determine which Bell pair generators 401 were successful.

Based at least in part on the information provided by the buses 402, the processor 404 configures multiplexer 406 to route Bell pairs received from the set of Bell pair generators 401 to a quantum computing circuit 410 via a first set of routing modes 405 (only one of which is labeled for visual clarity), and route photons received from the set of Bell pair generators 401 that are not in a Bell pair back to the set of Bell pair generators 401 via a second set of routing modes 407 (only one of which is labeled for visual clarity) for a second or successive attempt to produce Bell pairs. Consider, as an example, a first attempt to produce Bell pairs by each of the Bell pair generators 401. Bell pair generators 401-$a$ and 401-$c$ may be successful; their Bell pairs are passed to quantum computing circuit 410. Bell pair generator 401-$b$ may output a first single-photon and nothing else, while Bell pair generator 401-$d$ may output second, third, and fourth single-photons not in a Bell state. The first, second, third, and fourth single-photons are routed back to Bell pair generator 401-$a$ for a second attempt to produce a Bell pair (e.g., excess photons are not necessarily routed back to the same Bell pair generator 401 that generated the excess photons, but are routed such as to create a group of photons that increases the success probability for the second attempt).

FIGS. 5A-5D illustrate a method 500 of obtaining a first pair of photons in a Bell state. In some embodiments, the method 500 is performed at a Bell pair generator (e.g., the Bell pair generators shown in FIG. 2). In some embodiments, obtaining a first pair of photons in a Bell state includes providing a sets of photons to the Bell pair generator (e.g., as shown in FIG. 2). In some embodiments, the sets of photons comprises single photons. In some embodiments, obtaining a first pair of photons in a Bell state includes attempting to obtain a first pair of photons in a Bell state (e.g., any of the Bell states), wherein the attempt has a predetermined success probability. In some embodiments, the predetermined success probability is based on the number of photons provided to the Bell pair generator. In some embodiments, the predetermined success probability is greater than 18.75%. In some embodiments, the predetermined success probability is less than 22%. In some embodiments, the predetermined success probability is 18.75% when four photons are provided to the Bell pair generator. In some embodiments, the predetermined success probability is 20.3125% when 6 photons are provided to the Bell pair generator. In some embodiments, the predetermined success probability is 21.875% when 8 photons are provided to the Bell pair generator.

Method 500 includes receiving (502) (e.g., at a first time), at an input of a first set of photonic modes (e.g., set of modes 204, FIG. 2), a first set of photons (e.g., a plurality of photons) in distinct photonic modes of the first set of photonic modes. The first set of photons includes at least four photons. Each mode of the first set of photonic modes is coupled to a respective mode of a second set of photonic modes. In some embodiments, a photon is received at each mode of the first set of photonic modes. In some embodiments, the photons are single-photons (e.g., exactly one photon is received on each mode of the first set of photonic modes). Typically, the first set of modes is not coupled to any photon detectors, so that photons at respective outputs of the first set of modes are passed to downstream components for further processing (e.g., a multiplexer, a GHZ generator, a quantum algorithm).

In some embodiments, method 500 includes coupling, using a first set of couplers (e.g., couplers 210, FIG. 2), each mode of the first set of photonic modes to a respective mode of a second set of photonic modes (e.g., set of photonic modes 204, FIG. 2). In some embodiments, each mode of the first set of photonic modes is coupled to exactly one respective mode of the second set of modes. In some embodiments, each mode of the second set of photonic modes is coupled to exactly one respective mode of the second set of photonic modes. In some embodiments, each mode of the first set of photonic modes is coupled in a one-to-one arrangement to the second set of photonic modes.

In some embodiments, a respective mode of the first set of modes is defined at least in part by a polarization of photons in the respective mode, and coupling the respective mode to a respective mode in the second set of modes includes rotating a polarization the photons (e.g., by 45 degrees or 90 degrees). In some embodiments, a respective mode in the first set of modes is defined at least in part by a waveguide carrying the respective mode, and coupling the respective mode to a respective mode in the second set of modes includes coupling the waveguide carrying the respective mode of the first set of modes to the respective waveguide carrying the respective mode of the second set of modes (e.g., using a beam splitter).

Method 500 includes receiving (506), at an input of a third set of photonic modes (e.g., set of photonic modes 214, FIG. 2), a second set of photons (e.g., a plurality of photons) in distinct photonic modes of the third set of photonic modes. In some embodiments, the second set of photons are ancillae photons. In some embodiments, the second set of photons includes at least one photon. In some embodiments, the second set of photons includes at least two photons. Each mode of the third set of photonic modes is coupled to a respective mode of the second set of photonic modes. In some embodiments, the second set of photons includes four photons. In some embodiments, the second set of photons includes a variable number of photons. In some embodiments, the second set of photons includes an even number of photons. In some embodiments, method 500 includes receiving fewer photons (e.g., single-photons) in the third set of modes than the number of modes in the third set of modes (e.g., the rest of the modes are vacuum modes).

Method 500 includes coupling, using a second set of couplers (e.g., couplers 216), each mode of the third set of photonic modes to a respective mode of the second set of photonic modes. In some embodiments, each mode of the third set of photonic modes is coupled to exactly one respective mode of the second set of modes. In some embodiments, each mode of the second set of photonic modes is coupled to exactly one respective mode of the third set of photonic modes. In some embodiments, each mode of the second set of photonic modes is coupled in a one-to-one arrangement to the third set of photonic modes.

In some embodiments, the second set of photonic modes includes first, second, third, and fourth photonic modes of the third set of photonic modes (e.g., modes 208-a through 208-d, respectively, FIG. 2). In some embodiments, method 500 includes coupling (e.g., using a third set of couplers, such as couplers 212-a through 212-d, FIG. 2) the first photonic mode of the second set of photonic modes (e.g., mode 208-a) to the second photonic mode of the second set of photonic modes (e.g., mode 208-b), coupling the third photonic mode of the second set of photonic modes (e.g., mode 208-c) to the fourth photonic mode of the second set of photonic modes (e.g., mode 208-d), coupling the first photonic mode of the second set of photonic modes (e.g., mode 208-a) to the fourth photonic mode of the second set of photonic modes (e.g., mode 208-d), and coupling the second photonic mode of the second set of photonic modes (e.g., mode 208-b) to the third photonic mode of the second set of photonic modes (e.g., mode 208-c).

In some embodiments, the third set of photonic modes includes first, second, third, and fourth photonic modes of the third set of photonic modes (e.g., modes 214-a through 214-d, respectively). In some embodiments, method 500 includes coupling the first photonic mode of the third set of photonic modes (e.g., mode 214-a) to the second photonic mode of the third set of photonic modes (e.g., mode 214-b) and coupling the third photonic mode of the third set of photonic modes (e.g., mode 214-c) to the fourth photonic mode of the third set of photonic modes (e.g., mode 214-d).

Method 500 includes providing (510), at an output of the second set of photonic modes, a third set of photons (e.g., a plurality of photons) to one or more photon detectors and providing (512), at an output of the third set of photonic modes, a fourth set of photons (e.g., a plurality of photons) to the one or more photon detectors (e.g., photon detectors 202, FIG. 2).

Method 500 includes outputting (514), at an output of the first set of photonic modes, a first photon and a second photon that are in a Bell state (e.g., any of the Bell states).

In some embodiments, the first set of photons consists of (516) four photons and the second set of photons consists of two photons. In some embodiments, The first photon and the second photon are output in a Bell state with a first non-zero probability. (e.g., 20.3125%).

In some embodiments, method 500 includes determining (518) whether the first set of photonic modes includes the first photon and the second photon that are in a Bell state based on information from the one or more photon detectors (e.g., whether generation of a Bell pair was successful for the attempt). In some embodiments, determining whether generation of a Bell pair was successful for the attempt includes detecting, using the one or more detectors, a set of photons on respective modes of the second set of photonic modes and the third set of photonic modes (e.g., detecting a detection pattern). In some embodiments, determining whether generation of a Bell pair was successful for the attempt further includes determining whether the detection pattern is indicative of successful generation of a Bell pair (e.g., indicative of the first photon and the second photon being in a Bell state). In some embodiments, determining whether the first set of photonic modes includes the first photon and the second photon that are in a Bell state includes determining which Bell state the first photon and the second photon are in. Thus, certain detection patterns are said to herald the generation of the Bell pair.

For example, method 500 includes detecting (520) photons provided to the one or more photon detectors, including: detecting, using the one or more photon detectors, a third photon in a first mode of either the second set of photonic modes or the third set of photonic modes; and detecting, using the one or more photon detectors, a fourth photon in a second mode of either the second set of photonic modes or the third set of photonic modes, wherein the second mode is distinct from the first mode.

In some embodiments, method 500 further includes determining (522) whether the first photon and the second photon are in a Bell state based on detection of the first photon in the first mode and the second photon in the second mode. In some embodiments, determining whether the first photon and the second photon are in a Bell state includes determining that each of the photons received at the inputs of the first set of photonic modes and the second set of photonic modes were detected (e.g., on distinct modes), except for the first photon and the second photon.

In some embodiments, method 500 includes, in accordance with a determination that the first set of photonic modes includes the first photon and the second photon that are in a Bell state, routing (524) the first photon and the second photon to a first set of routing modes, and, in accordance with a determination that the first set of photonic modes includes the first photon and the second photon that are in the Bell state, routing the first photon and the second photon to a second set of routing modes that is distinct from the first set of routing modes.

In some embodiments, method 500 includes obtaining a second pair of photons in a Bell state (e.g., attempting to obtain a second pair of photons in a Bell state). In some embodiments, obtaining the second pair of photons in a Bell state is performed non-concurrently with obtaining the first pair of photons in a Bell state. Obtaining a second pair of photons in a Bell state includes receiving (526) (e.g., at a second time different from the first time), at the input of the first set of photonic modes, a fifth set of photons (e.g., a plurality of photons) in distinct photonic modes of the first set of photonic modes. The fifth set of photons includes at least four photons.

Obtaining a second pair of photons in a Bell state further includes receiving (528), at the input of the third set of photonic modes, a sixth set of photons (e.g., a plurality of photons) in distinct photonic modes of the third set of photonic modes. The sixth set of photons includes at least four photons. In some embodiments, the sixth set of photons includes a different number of photons than the second set of photons. In some embodiments, the sixth set of photons includes an even number of photons. In some embodiments, the fifth set of photons and the sixth set of photons, combined, include 8 photons.

Obtaining a second pair of photons in a Bell state includes outputting (530), at the output of the first set of photonic modes, a fifth photon and a sixth photon that are in a Bell state. The fifth photon and the sixth photon are output in a Bell state with a second non-zero probability different from the first non-zero probability.

Stated another way, in some embodiments, the method 500 is repeated (e.g., using the same Bell pair generator, but at a different time) by attempting to obtain a second pair of photons in a Bell state (e.g., attempting a second shot), where the number of photons used to attempt to obtain a second pair of photons in a Bell state is different from the number of photons used to attempt to obtain the first pair of photons in a Bell state (e.g., the Bell pair generator can operate with different numbers of photons provided to its inputs).

In some embodiments, method 500 includes obtaining a third pair of photons in a Bell state (e.g., non-concurrently with obtaining the first pair of photons in a Bell state and obtaining the second pair of photons in a Bell state). Obtaining a third pair of photons in a Bell state includes receiving (532) (e.g., at a third time different from the first time and the second time), at the input of the first set of photonic modes, a seventh set of photons (e.g., a plurality of photons) in distinct photonic modes of the first set of photonic modes. The seventh set of photons includes at least four photons.

Obtaining a third pair of photons in a Bell state further includes receiving (534), at the input of the third set of photonic modes, zero photons.

Obtaining a third pair of photons in a Bell state further includes outputting (536), at the output of the first set of photonic modes, a seventh photon and an eighth photon that are in a Bell state. The seventh photon and the eighth photon are output in a Bell state with a third non-zero probability different from the first non-zero probability and the second non-zero probability.

Stated another way, in some embodiments, the method 500 performs no less efficiently when provided with four photons than a Bell pair generator configured to receive only four photons.

Figure 6:
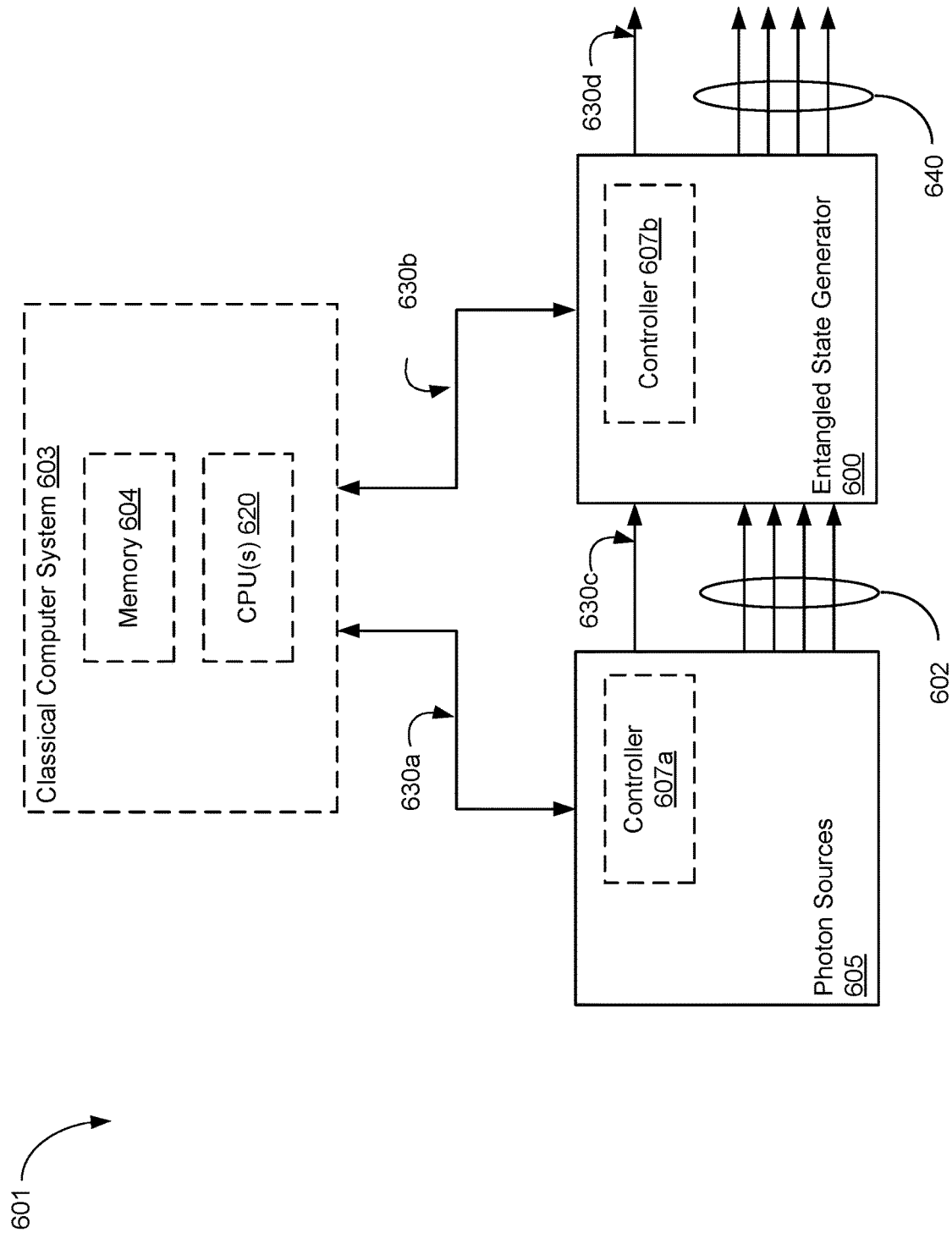
FIG. 6 illustrates a schematic diagram of a system for obtaining a pair of photons in a Bell state, in accordance with some embodiments.

FIG. 6 illustrates a schematic diagram of a system 601 for obtaining photons in an entangled state (e.g., a GHZ state, Bell pair, or the like), in accordance with some embodiments. System 601 includes a photon source module 605 that is optically connected to entangled state generator 600. Both photon source module 605 and entangled state generator 600 can be coupled (e.g., electrically coupled via a classical channel 630) to a classical computer system 603 such that the classical computer system 603 can communicate with and/or control the photon source module 605 and/or the entangled state generator 600. Photon source module 605 can include a collection of single-photon sources that can provide output photons to entangled state generator 600 by way of interconnecting waveguides 602. Entangled state generator 600 can receive the output photons and convert them to one or more entangled photonic states and then output these entangled photonic states into output waveguides 640 to some downstream circuit that can use the entangled states. In some examples, the entangled states generated by the entangled state generator 600 can be used as resources for a downstream quantum optical circuit (not shown), e.g., they can be fused together to build a larger cluster state to be used in a measurement-based quantum computing scheme. In some embodiments, the entangled states generated by the entangled state generator 600 can be used in any system that uses entanglement shared by multiple parties, e.g., in quantum key distribution, quantum computing protocols based on teleportation, quantum communication, and the like.

In terms of the Fock state description of quantum states described above, in one example, the photon source module 605 can output one photon per waveguide thereby generating the quantum state denoted by $|1111\rangle_{1,2,3,4}$. The action of the entangled state generator 600 is to convert this input state $|1111\rangle_{1,2,3,4}$ to an entangled state such as a Bell state, e.g., a state described by any one of Equations (3)-(6) described above, with some success probability P. The entangled state is output into output waveguides 640 with a probability P that is high compared to current methods for generating Bell states or GHZ states. In some embodiments, the entangled state generator 600 can have P>20%, P>50%, e.g., P=67%.

In some embodiments, system 601 includes classical channels 630 (e.g., classical channels 630a through 630b) for interconnecting and providing classical information between components. It should be noted that classical channels 630 need not all be the same. For example, classical channel 630a through 630c may comprise a bi-directional communication bus carrying one or more reference signals, e.g., one or more clock signals, one or more control signals, or any other signal that carries classical information, e.g., heralding signals, photon detector readout signals, and the like.

In some embodiments, system 601 includes classical computer system 603 that communicates with and/or controls the photon source module 605 and/or the entangled state generator 600. For example, in some embodiments, classical computer system 603 is used to configure one or more circuits, e.g., using a system clock that may be provided to photon sources 605 and entangled state generator 600 as well as any downstream quantum photonic circuits used for performing quantum computation (e.g., quantum computation circuits, which may include optical circuits, electrical circuits, or other types of circuits). In some embodiments, classical computer system 603 includes memory 604, one or more processors 620, a power supply, an input/output (I/O) subsystem, and a communication bus or interconnecting these components. The processors 620 can execute modules, programs, and/or instructions stored in memory 604 and thereby perform processing operations.

In some embodiments, memory 604 stores one or more programs (e.g., sets of instructions) and/or data structures. For example, in some embodiments, as described above, entangled state generator 600 attempts to produce a Bell pair. In some embodiments, memory 604 stores one or more programs for determining whether entangled state generator 600 was successful and configuring downstream circuitry (not shown) based on the result. To that end, in some embodiments, memory 604 stores detection patterns (described above) from which the classical computing system 603 can determine whether a entangled state generator 600 was successful. In addition, memory 604 can store settings that are provided to the various configurable components (e.g., switches) described herein that are configured by, e.g., setting one or more phase shifts for the component. For example, FIG. 7B illustrates a schematic diagram of a switch that can be configured to output a photon into either of two waveguides based on a configurable phase shift.

In some embodiments, some or all of the above-described functions may be implemented with hardware circuits on photon source module 605 and/or entangled state generator 600. For example, in some embodiments, photon source module 605 includes one or more controllers 607a (e.g., logic controllers) (e.g., which may comprise field programmable gate arrays (FPGAs), application specific integrated circuits (ASICs), a "system on a chip" that includes classical processors and memory, or the like). In some embodiments, controller 607a determines whether photon source module 605 was successful (e.g., for a given attempt on a given clock cycle, described below) and outputs a reference signal indicating whether photon source module 605 was successful. For example, in some embodiments, controller 607a outputs a logical high value to classical channel 630a and/or classical channel 630c when photon source module 605 is successful and outputs a logical low value to classical channel 630a and/or classical channel 630c when photon source module 605 is not successful. In some embodiments, the output of controller 607a is used to configure hardware-based logic in controller 607b.

Similarly, in some embodiments, entangled state generator 600 includes one or more controllers 607b (e.g., logical controllers) (e.g., which may comprise FPGAs, ASICs, or the like) that determine whether entangled state generator 600 has succeeded and output a reference signal to classical channels 630b and/or 630d to inform other components as to whether the entangled state generator 600 has succeeded.

In some embodiments, classical computing system 603 generates a system clock signal and provides the system clock signal to photon source module 605 and entangled state generator 600 via classical channels 630a and/or 630b. In some embodiments, the system clock signal provided to photon source module 605 triggers photon source module 605 to attempt to output one photon per waveguide thereby attempting to generate the quantum state denoted by $|1111\rangle_{1,2,3,4}$. In some embodiments, the system clock signal provided to entangled state generator 600 triggers, or gates, sets of detectors in entangled state generator 600 to attempt to detect photons (e.g., as described with reference to operations 520, FIG. 5B). For example, in some embodiments, triggering a set of detectors in entangled state generator 600 to attempt to detect photons includes gating the set of detectors.

It should be noted that, in some embodiments, photon source module 605 and entangled state generator 600 can have internal clocks. For example, photon source module 605 can have an internal clock generated and/or used by controller 607a and entangled state generator 600 has an internal clock generated and/or used by controller 607b. In some embodiments, the internal clock of photon source module 605 and/or entangled state generator 600 is synchronized to an external clock (e.g., the system clock provided by classical computer system 603) (e.g., through a phase-locked loop). In some embodiments, any of the internal clocks and themselves be used as the system clock, e.g., an internal clock of the photon source can be distributed to other components in the system and used as the master/system clock.

In some embodiments, photon source module 605 includes a plurality of probabilistic photon sources that can be spatially and/or temporally multiplexed, i.e., a so-called multiplexed single photon source. In one example of such a source, the source is driven by a pump, e.g., a light pulse, that is coupled into an optical resonator that, through some nonlinear process (e.g., spontaneous four wave mixing, second harmonic generation, and the like) can generate zero, one, or more photons. As used herein, the term "attempt" is used to refer to the act of driving a photon source with some sort of driving signal, e.g., a pump pulse, that may produce output photons non-deterministically (i.e., in response to the driving signal, the probability that the photon source will generate one or more photons is less than 1). In some embodiments, a respective photon source is most likely to, on a respective attempt, produce zero photons (e.g., there is a 90% probability of producing zero photons per attempt to produce a single-photon). The second most likely result for an attempt is production of a single-photon (e.g., there is a 9% probability of producing a single-photon per attempt to produce a single-photon). The third most likely result for an attempt is production of two photons (e.g., there is a 1% probability of producing two photons per attempt to produce a single-photon). In some circumstances, there is less than 1% probability of producing more than two photons.

In some embodiments, the apparent efficiency of the photon sources is increased by using a plurality of single-photon source (e.g., a redundant number of single-photon sources) and multiplexing the outputs of the plurality of photon sources.

Many different types of photon sources can be employed with the Bell state generators described herein. Examples of photon pair sources can include a microring-based spontaneous four wave mixing (SPFW) heralded photon source (HPS). However, the precise type of photon source used is not critical and any type of nonlinear source, employing any process, such as SPFW, spontaneous parametric down-conversion (SPDC), or any other process can be used. Other classes of sources that do not necessarily require a nonlinear material can also be employed, such as those that employ atomic and/or artificial atomic systems can be used, e.g., quantum dot sources, color centers in crystals, and the like.

In some cases, sources may or may not be coupled to photonic cavities, e.g., as can be the case for artificial atomic systems such as quantum dots coupled to cavities. Other types of photon sources also exist for SPWM and SPDC, such as optomechanical systems and the like.

For the sake of illustration, an example which employs spatial multiplexing of several non-deterministic sources is referred to herein as a multiplexed (MUX) photon source. One of ordinary skill will appreciate that many different spatial MUX architectures are possible without departing from the scope of the present disclosure. Temporal MUXing can also be implemented instead of or in combination with spatial multiplexing. MUX schemes that employ log-tree, generalized Mach-Zehnder interferometers, multimode interferometers, chained sources, chained sources with dump-the-pump schemes, asymmetric multi-crystal single photon sources, or any other type of MUX architecture can be used. In some embodiments, the photon source can employ a MUX scheme with quantum feedback control and the like.

The photon sources of photon source module 605 output photons (e.g., single photons) to Bell state generator 600 via waveguides 602. Various embodiments of Bell state generators and waveguides are described in greater detail elsewhere in this document.

Figure 7A:
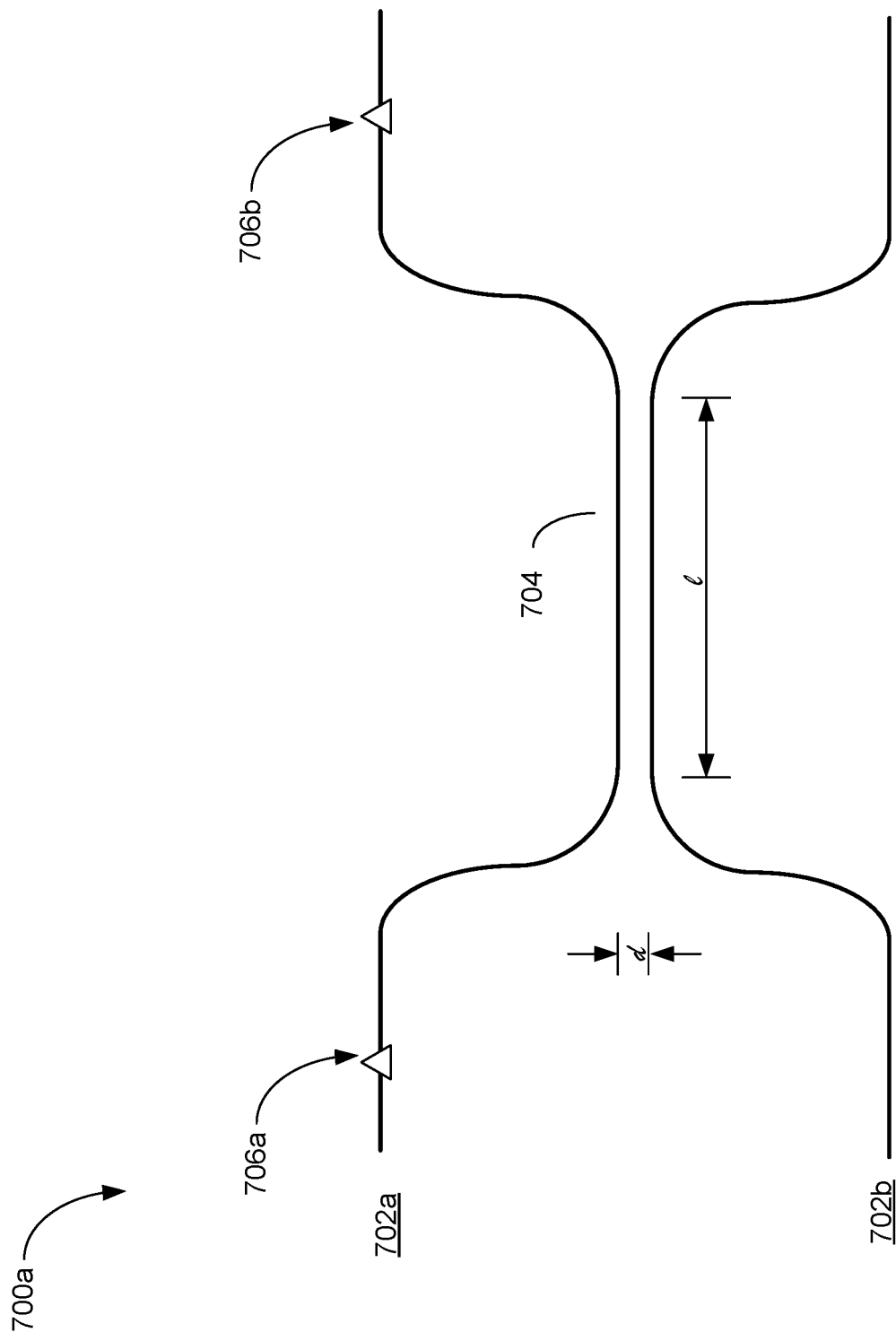
FIGS. 7A-7C illustrate schematic diagrams of waveguide beam splitters, in accordance with some embodiments.
Figure 7B:
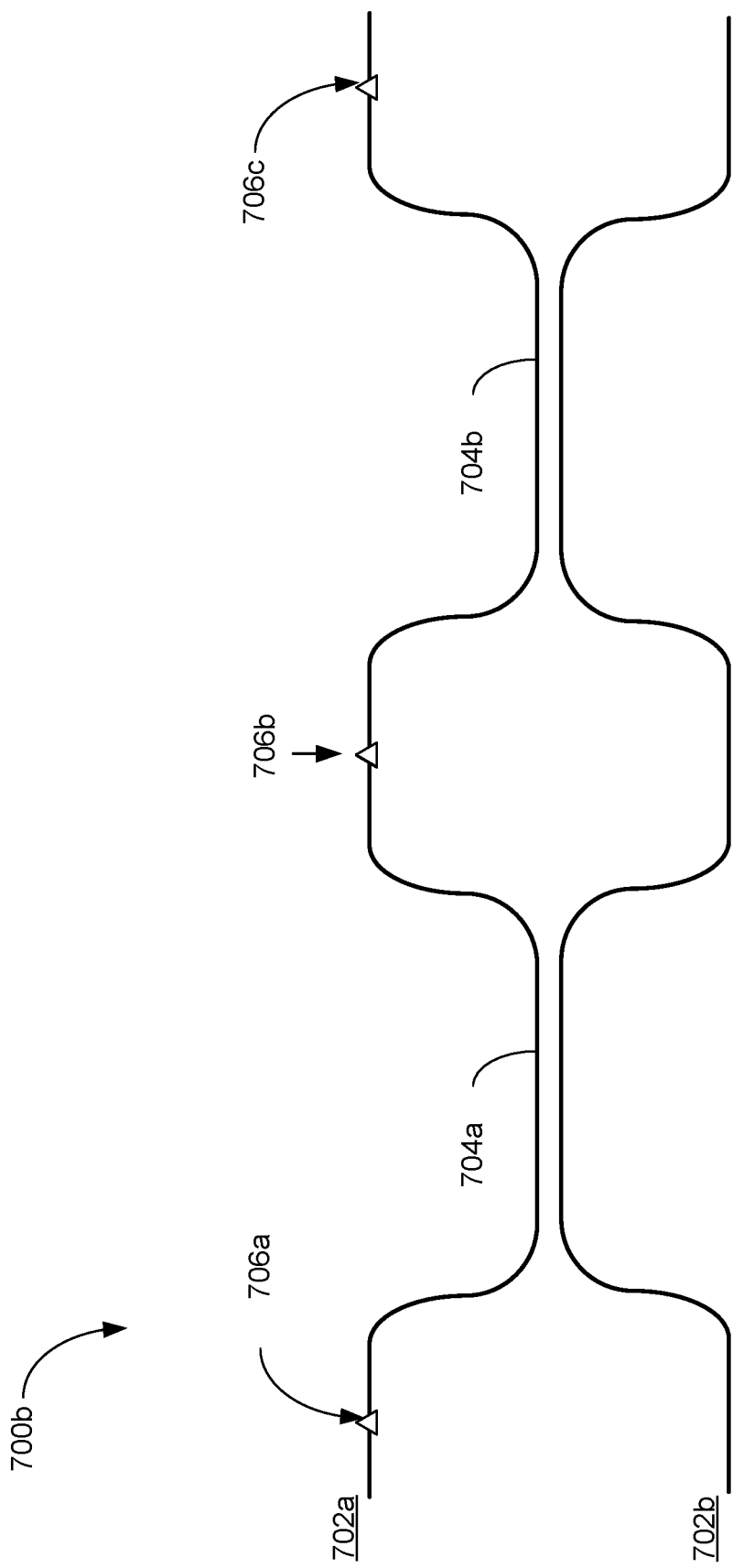
Figure 7C:
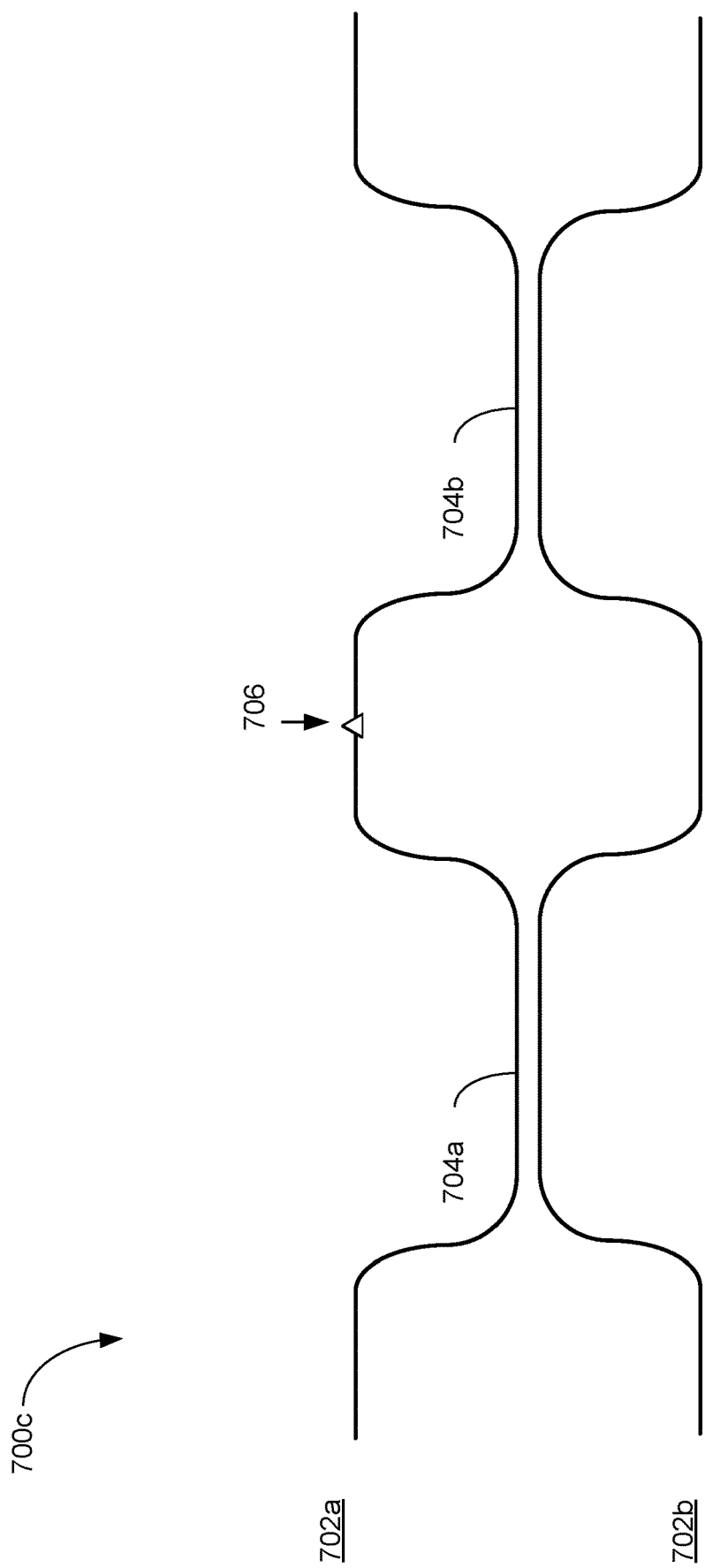

FIGS. 7A-7C illustrate schematic diagrams of waveguide beam splitters 700 (e.g., 700a, 700b, and 700c, respectively), in accordance with some embodiments. Such waveguide beam splitters are examples of couplings that can be used in any of the preceding photonic circuits for generating entangled photons. In some embodiments, beam splitters are implemented in integrated photonics via directional couplings, which are realized by bringing together the different waveguides (e.g., modes 702a and 702b) close enough so that the evanescent field of one of them can couple into the other one. By controlling the separation d between the waveguides 702 and/or the length/of the coupling region 704, different transmissivity can be obtained and therefore this implementation is equivalent to a beam-splitter in bulk optics. In this manner, wave guide beam splitter 700 may be configured to have a transmissivity equal to 0.5 (i.e., a 50:50 beam splitter, greater than 0.6, greater than 0.7, greater than 0.8, or greater than 0.9).

In some embodiments, waveguide beam splitters 700 include variable phase-shifters 706. Variable phase-shifters can be implemented in integrated circuits, providing control over the relative phases of the state of a photon spread over multiple modes. For the silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide 702 by an amount of the order of $10^{-5}$ K. One of skill in the art, however, having had the benefit of this disclosure, will understand that any effect that changes the refractive index of a portion of the waveguide can be used to generate a variable, electrically tunable, phase shift. For example, some embodiments use beam splitters based on any material that supports an electro-optic effect, so-called $X^2$ and $X^3$ materials such as lithium niobite, barium borate (BBO), potassium titanyl phosphate (KTP), barium titanate (BTO), and the like and even doped semiconductors such as silicon, germanium, and the like.

Beam-splitters with variable transmissivity and arbitrary phase relationships between output modes can also be achieved by combining directional couplings and variable phase-shifters in a Mach-Zehnder Interferometer (MZI) configuration, e.g., as shown in FIG. 7B. Complete control over the relative phase and amplitude of the two paths in dual rail encoding can be achieved by varying the phases imparted by phase shifters 706a, 706b, and 706c (separated by coupling region 704a and coupling region 704b). FIG. 7C shows a slightly simpler example of a MZI that allows for a variable transmissivity between modes 702a and 702b by varying the phase imparted by the phase shifter 706. FIGS. 7A-7C are only three examples of how one could implement a mode coupling in a physical device, but any type of mode coupling/beam splitter can be used without departing from the scope of the present disclosure.

For example, the waveguide beam splitter in FIG. 7C can be used to switch photons in mode 702a into either mode 702a or 702b by adjusting the phase of phase shifter 706b appropriately. Thus, a tunable waveguide beam splitter is a device for mode swapping and optical switching. In addition, these beam splitters, e.g., in a 50:50 configuration can be used to spread the quantum state of a single photon equally across multiple modes (waveguides).

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

It will also be understood that, although the terms first, second, etc., are, in some instances, used herein to describe various elements, these elements should not be limited by these terms. These terms are only used to distinguish one element from another. For example, a first switch could be termed a second switch, and, similarly, a second switch could be termed a first switch, without departing from the scope of the various described embodiments. The first switch and the second switch are both switches, but they are not the same switch unless explicitly stated as such.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A device comprising:
one or more photon detectors;
one or more waveguides having a plurality of sets of photonic modes, including:
a first set of photonic modes configured for outputting a first set of photons, wherein the first set of photonic modes is coupled with one or more photon sources, wherein the first set of photonic modes includes at least four photonic modes;
a second set of photonic modes coupled with the one or more photon detectors to provide a second set of photons to the one or more photon detectors, wherein the second set of photonic modes includes at least four photonic modes; and
a third set of photonic modes coupled with the one or more photon sources and coupled with the one or more photon detectors to provide a third set of photons to the one or more photon detectors, wherein the third set of photonic modes includes at least two photonic modes;
a first set of beam splitters coupling each mode of the first set of photonic modes to a respective mode of the second set of photonic modes;
a second set of beam splitters coupling each mode of the third set of photonic modes to a respective mode of the second set of photonic modes; and
wherein the first set of beam splitters and the second set of beam splitters are configured, via couplings between respective modes of the first set of photonic modes and the second set of photonic modes, to cause the first set of photonic modes to output, with a first non-zero probability, a pair of photons in a Bell state when a first number of photons is provided to respective inputs of the first set of photonic modes and the third set of photonic modes.

2. The device of claim 1, wherein the first set of beam splitters and the second set of beam splitters are configured to cause the first set of photonic modes to output, with a second non-zero probability different from the first non-zero probability, a pair of photons in a Bell state when a second number of photons different from the first number of photons is provided to respective inputs of the first set of photonic modes and the third set of photonic modes.

3. The device of claim 2, wherein the first set of beam splitters and the second set of beam splitters are configured to cause the first set of photonic modes to output, with a third non-zero probability different from the first non-zero probability and the second non-zero probability, a pair of photons in a Bell state when a third number of photons different from the first number of photons and the second number of photons is provided to respective inputs of the first set of photonic modes and the third set of photonic modes.

4. The device of claim 1, wherein the second set of photonic modes is not coupled with a photon source.

5. The device of claim 1, wherein:
the second set of photonic modes includes first, second, third, and fourth photonic modes of the second set of photonic modes; and
the device further comprises:
a third set of beam splitters including:
a first beam splitter of the third set of beam splitters coupling the first photonic mode of the second set of photonic modes to the second photonic mode of the second set of photonic modes;
a beam splitter of the third set of beam splitters coupling the third photonic mode of the second set of photonic modes to the fourth photonic mode of the second set of photonic modes;
a beam splitter of the third set of beam splitters coupling the first photonic mode of the second set of photonic modes to the fourth photonic mode of the second set of photonic modes; and
a beam splitter of the third set of beam splitters coupling the second photonic mode of the second set of photonic modes to the third photonic mode of the second set of photonic modes.

6. The device of claim 1, wherein:
the third set of photonic modes includes first, second, third, and fourth photonic modes of the third set of photonic modes; and
the device further comprises:
a fourth set of beam splitters including:
a beam splitter of the fourth set of beam splitters coupling the first photonic mode of the third set of photonic modes to the second photonic mode of the third set of photonic modes; and
a beam splitter of the fourth set of beam splitters coupling the third photonic mode of the third set of photonic modes to the fourth photonic mode of the third set of photonic modes.

7. The device of claim 1, wherein the second set of photons has an even number of photons.

8. The device of claim 1, further including a processor for determining, based on information from the one or more photon detectors, whether photons output by the first set of photonic modes include a pair of photons in a Bell state.

9. A method, comprising:
obtaining a first pair of photons in a Bell state by:
receiving, at an input of one or more waveguides having a plurality of sets of photonic modes including a first set of photonic modes, a first set of photons in distinct photonic modes of the first set of photonic modes, wherein the first set of photons includes at least four photons, wherein each mode of the first set of photonic modes is coupled to a respective mode of a second set of photonic modes of the one or more waveguides;
receiving, at an input of a third set of photonic modes of the one or more waveguides, a second set of photons in distinct photonic modes of the third set of photonic modes, wherein the second set of photons includes at least one photon, wherein each mode of the third set of photonic modes is coupled to a respective mode of the second set of photonic modes;
providing, via the second set of photonic modes, a third set of photons to one or more photon detectors;
providing, via the third set of photonic modes, a fourth set of photons to the one or more photon detectors; and
outputting, via first set of photonic modes, a first photon and a second photon that are in a Bell state.

10. The method of claim 9, further including:
determining whether the first set of photonic modes includes the first photon and the second photon that are in a Bell state based on information from the one or more photon detectors.

11. The method of claim 10, wherein determining whether the first set of photonic modes includes the first photon and the second photon that are in a Bell state based on information from the one or more photon detectors includes:
  detecting photons provided to the one or more photon detectors, including:
    detecting, using the one or more photon detectors, a third photon in a first mode of either the second set of photonic modes or the third set of photonic modes; and
    detecting, using the one or more photon detectors, a fourth photon in a second mode of either the second set of photonic modes or the third set of photonic modes, wherein the second mode is distinct from the first mode; and
  determining whether the first photon and the second photon are in a Bell state based on detection of the first photon in the first mode and the second photon in the second mode.

12. The method of claim 10, further comprising:
  in accordance with a determination that the first set of photonic modes includes the first photon and the second photon that are in a Bell state, routing the first photon and the second photon to a first set of routing modes; and,
  in accordance with a determination that the first set of photonic modes includes the first photon and the second photon that are in a Bell state, routing the first photon and the second photon to a second set of routing modes that is distinct from the first set of routing modes.

13. The method of claim 9, wherein:
  the first set of photons consists of four photons;
  the second set of photons consists of two photons; and
  wherein the first photon and the second photon are output in a Bell state with a first non-zero probability.

14. The method of claim 13, further comprising:
  obtaining a second pair of photons in a Bell state by:
    receiving, at the input of the one or more waveguides via the first set of photonic modes, a fifth set of photons in distinct photonic modes of the first set of photonic modes, wherein the fifth set of photons includes at least four photons;
    receiving, at the input of the one or more waveguides via the third set of photonic modes, a sixth set of photons in distinct photonic modes of the third set of photonic modes, wherein the sixth set of photons includes at least four photons; and
    outputting, at the output of the one or more waveguides via the first set of photonic modes, a fifth photon and a sixth photon that are in a Bell state,
    wherein the fifth photon and the sixth photon are output in a Bell state with a second non-zero probability different from the first non-zero probability.

15. The method of claim 14, further comprising:
  obtaining a third pair of photons in a Bell state by:
    receiving, at the input of the one or more waveguides via the first set of photonic modes, a seventh set of photons in distinct photonic modes of the first set of photonic modes, wherein the fifth set of photons includes at least four photons;
    receiving, at the input of the one or more waveguides via the third set of photonic modes, zero photons; and
    outputting, at the output of the first set of photonic modes, a seventh photon and an eighth photon that are in a Bell state,
    wherein the seventh photon and the eighth photon are output in a Bell state with a third non-zero probability different from the first non-zero probability and the second non-zero probability.

16. The method of claim 9, wherein the second set of photons includes an even number of photons.

17. The method of claim 9, wherein:
  the second set of photonic modes includes first, second, third, and fourth photonic modes; and
  the method includes:
    coupling the first photonic mode of the second set of photonic modes to the second photonic mode of the second set of photonic modes;
    coupling the third photonic mode of the second set of photonic modes to the fourth photonic mode of the second set of photonic modes;
    coupling the first photonic mode of the second set of photonic modes to the fourth photonic mode of the second set of photonic modes; and
    coupling the second photonic mode of the second set of photonic modes to the third photonic mode of the second set of photonic modes.

18. The method of claim 9, wherein:
  the third set of photonic modes includes first, second, third, and fourth photonic modes; and
  the method includes:
    coupling the first photonic mode of the third set of photonic modes to the second photonic mode of the third set of photonic modes; and
    coupling the third photonic mode of the third set of photonic modes to the fourth photonic mode of the third set of photonic modes.

* * * * *